(12) United States Patent
Tomsho et al.

(10) Patent No.: US 11,773,114 B2
(45) Date of Patent: Oct. 3, 2023

(54) PROTECTIVE GROUPS AND METHODS FOR PROTECTING BENZOXABOROLES OR OXABOROLES

(71) Applicant: SAINT JOSEPH'S UNIVERSITY, Philadelphia, PA (US)

(72) Inventors: John W. Tomsho, King of Prussia, PA (US); James M. Gamrat, West Chester, PA (US)

(73) Assignee: Saint Joseph's University, Philadelphia, PA (US)

( * ) Notice: Subject to any disclaimer, the term of this patent is extended or adjusted under 35 U.S.C. 154(b) by 0 days.

(21) Appl. No.: 17/833,345

(22) Filed: Jun. 6, 2022

(65) Prior Publication Data

US 2022/0298179 A1 Sep. 22, 2022

Related U.S. Application Data

(62) Division of application No. 16/978,909, filed as application No. PCT/US2019/021552 on Mar. 11, 2019, now Pat. No. 11,427,603.

(60) Provisional application No. 62/640,916, filed on Mar. 9, 2018.

(51) Int. Cl.
*C07F 5/02* (2006.01)

(52) U.S. Cl.
CPC ............... *C07F 5/025* (2013.01); *C07F 5/02* (2013.01); *C07F 5/022* (2013.01); *Y02P 20/55* (2015.11)

(58) Field of Classification Search
CPC ...................................................... C07F 5/025
See application file for complete search history.

(56) References Cited

U.S. PATENT DOCUMENTS

| | | | |
|---|---|---|---|
| 4,265,664 A | 5/1981 | Saischek | |
| 5,147,914 A | 9/1992 | Horacek | |
| 5,384,410 A | 1/1995 | Kettner | |
| 5,880,188 A | 3/1999 | Austin et al. | |
| 8,168,614 B2 | 5/2012 | Baker et al. | |
| 8,338,601 B2 | 12/2012 | Burke et al. | |
| 10,130,096 B2 | 11/2018 | Bobbio et al. | |
| 11,427,603 B2 * | 8/2022 | Tomsho | C07F 5/02 |
| 2014/0275601 A1 | 9/2014 | Raines et al. | |

FOREIGN PATENT DOCUMENTS

| | | |
|---|---|---|
| WO | 9533754 A1 | 12/1995 |
| WO | 2013084199 A1 | 6/2013 |

OTHER PUBLICATIONS

Besson, et al., "Long-term effects of chronic nicotine exposure on brain nicotinic receptors", PNAS, vol. 104, No. 19, May 8, 2007, pp. 8155-8160.
Chaturvedi, A., et al., "Boron Spirochelates Derived from 24Sopropoxy-4H-1,3,2-Benzodioxaborin, Synthesis and Reactivity in Inorganic and Metal-Organic Chemistry", 23:9, (1993), 1599-1615, DOI: 10.1080/15533179308016709.
Alexander D. Dilman, et al., "Trifluoromethylation of Salicyl Aldimines", J. Org. Chem. 2007, 72, 8604-8607.
Denis Frath, et al., "Facile Synthesis of Highly Fluorescent Boranil Complexes", Organic Letters, 2011, vol. 13, No. 13, 3414-3417.
Denis Frath, et al., "Supporting Information: Facile Synthesis of Highly Fluorescent Boranil Complexes", Organic Letters, 2011, vol. 13, No. 13, 3414-3417.
Graeme J. Gainsford, et al., "Three-in-one: the novel packing and structures of three independent molecules of a tricyclic boron compound", Acta Cryst. (2006). C62, o65-o67, DOI: 10.1107/S0108270105041089.
James M. Gamrat, et al., "Protection of the Benzoxaborole Moiety: Synthesis and Functionalization of Zwitterionic Benzoxaborole Complexes", J. Org. Chem. 2018, 83, 6193-6201.
Yoshihide Hattori, et al., "Electronic Supplementary Information: Detection of Boronic Acid Derivatives in Cells Using, Fluorescent Sensor", The Royal Society of Chemistry 2015, 28 pages.
Y. Hattori, et al., Accepted Manuscript, Org. Biomol. Chem., 2015, DOI: 10.1039/C5OB00753D.
Hoshihide Hattori, et al., "Development and elucidation of a novel fluorescent boron-sensor for the analysis of boronic acid-containing compounds", Sensors, 2017, 17, 2436; doi:103390/s17102436.
Cristina C. Jimenez, et al., "Synthesis and chemical-optical characterization of novel two-photon fluorescent borinates derived from Schiff bases", Journal of Organometallic Chemistry 755 (2014) 33-40.
Mario Rodriguez, et al., "Imino Diels-Alder reaction of boronates. Preparation and characterization of new 3,4-dihydroquinoline and 1,2,3,6-tetrahydropyridine derivatives", Journal of Organometallic Chemistry 692 (2007) 2425-2435.
S. M. Tripathi, et al., "Acetoxyboron Derivatives of N-Substituted Salicylaldimines", J. Inorg. Nocl. Chem. vol 40, pp. 983-985.
Zhang, et al., "Palladium-catalyzed cross-coupling of aryl chlorides with O, N-chelate stabilized diarylborinates", J. of Organometallic Chemistry, vol. 842, Aug. 1, 2017, pp. 54-58.

* cited by examiner

*Primary Examiner* — Golam M Shameem
(74) *Attorney, Agent, or Firm* — Saul Ewing LLP; Domingos J. Silva; Kevin T. O'Brien

(57) ABSTRACT

The present invention relates in part protective groups that can be used to reversibly protect benzoxaboroles and yield the corresponding protected complexes. The invention further relates to the use of these protective groups to protect benzoxaboroles.

7 Claims, No Drawings

PROTECTIVE GROUPS AND METHODS FOR PROTECTING BENZOXABOROLES OR OXABOROLES

CROSS-REFERENCE TO RELATED APPLICATIONS

The present application is a division of, and claims priority to, U.S. patent application Ser. No. 16/978,909, filed Sep. 8, 2020, now allowed, which is a 35 U.S.C. § 371 national phase application from, and claims priority to, PCT International Patent Application No. PCT/US2019/021552, filed Mar. 11, 2019, which claims priority under 35 U.S.C. § 119(e) to U.S. Provisional Application No. 62/640,916, filed Mar. 9, 2018, all of which are hereby incorporated by reference herein in their entireties.

BACKGROUND OF THE INVENTION

The incorporation of boronic acids and benzoxaboroles into pharmaceutical agents has led to increased interest in the interactions of such compounds with biological targets, based on the Lewis acidic nature of boron. These interactions arise from an empty p-orbital on the boron atom, resulting in the unique ability to reversibly bond to Lewis basic amino acids in enzyme active sites.

Benzoxaboroles in particular have become increasingly relevant in drug design and in the pharmaceutical industry. They are cyclic boronate ester derivatives of phenyl boronic acid, which contain a phenyl ring fused to a 5-membered oxaborole ring (Scheme 1). These compounds have enhanced reactivity resulting from ring strain about the boron center. Two benzoxaborole-containing drugs have recently been approved by the FDA: KERYDIN® (tavaborole), an aminoacyl-transfer ribonucleic acid (tRNA) synthetase inhibitor used for the treatment of onychomycosis (toenail fungus), and EUCRISA® (crisaborole), a PDE-4 enzyme inhibitor used for the treatment of atopic dermatitis (eczema). Benzoxaboroles have also been shown to exhibit other types of bioactivity including antibacterial, antiviral, and anti-malarial activity.

Benzoxaboroles are generally considered more stable than their boronic acid counterparts. However, the possibility of side reactivity arising from a more reactive p-orbital about the boron center is of concern when reacting with nucleophiles and oxidizing agents. Additionally, a lack of organic solubility arises as substituents capable of hydrogen bonding, and/or polymerizing via condensation, are introduced on the benzoxaborole scaffold. In the case of boronic acids, these issues are addressed with a series of widely used protecting groups, such as N-methylimidodiacetic boronic acid esters (MIDA boronates) and trifluoroborate salts.

Scheme 1 a)

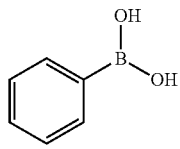

Phenylboronic acid b)

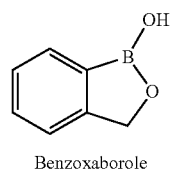

Benzoxaborole c)

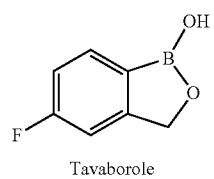

Tavaborole d)

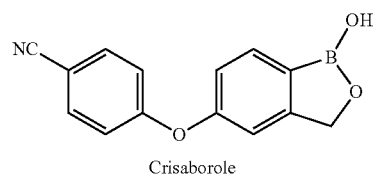

Crisaborole

There has been only one benzoxaborole protecting group validated in the literature: 1-dimethylamino-8-methylaminonaphthalene. While stable to a variety of reaction conditions and column chromatography, this protecting group is not stable to oxidation, and its subsequent removal with re-isolation of the benzoxaborole has not been described.

There is thus a need in the art for novel protective groups and methods for reversibly protecting benzoxaboroles and/or oxaboroles. The present invention fulfills this need.

BRIEF SUMMARY OF THE INVENTION

The invention provides a compound of formula (II) or (II'), or a salt, solvate, enantiomer, diastereoisomer or tautomer thereof:

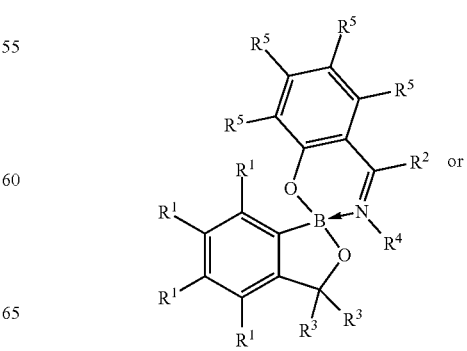

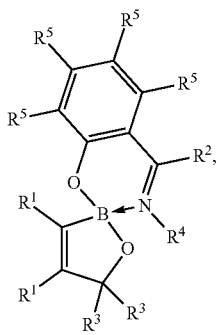

(II')

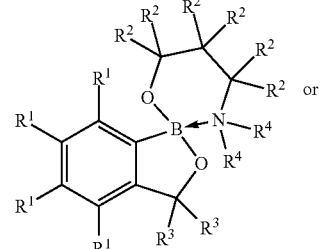

(I)

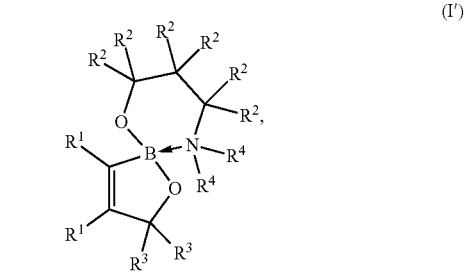

(I')

wherein:

each occurrence of R¹ is independently selected from the group consisting of H, OH, halide, amine, carboxylic acid, C(=O)O($C_1$-$C_4$)alkyl, —C(=O)$NH_2$, —C(=O)NH($C_1$-$C_4$)alkyl, C(=O)N(($C_1$-$C_4$)alkyl)$_2$, —C(=NH)$NH_2$, phosphoric acid, phosphonate, sulfonamide, nitro, cyano, optionally substituted $C_{1-6}$ alkyl, optionally substituted $C_{2-6}$ alkenyl, optionally substituted $C_{2-6}$ alkynyl, optionally substituted $C_3$-$C_8$ cycloalkyl, optionally substituted $C_1$-$C_8$ heteroalkyl, optionally substituted $C_3$-$C_8$ heterocycloalkyl, optionally substituted $C_{1-6}$ perhaloalkyl, optionally substituted $C_{1-6}$ alkoxy, optionally substituted aryl, optionally substituted aryloxy, optionally substituted heteroaryl, optionally substituted heteroaryloxy, and optionally substituted benzyl, R² is selected from the group consisting of H, halo, optionally substituted $C_{1-6}$ alkyl, optionally substituted $C_{2-6}$ alkenyl, optionally substituted $C_{2-6}$ alkynyl, optionally substituted $C_3$-$C_8$ cycloalkyl, optionally substituted $C_1$-$C_8$ heteroalkyl, optionally substituted $C_3$-$C_8$ heterocycloalkyl, and optionally substituted $C_{1-6}$ perhaloalkyl;

each occurrence of R³ is independently selected from the group consisting of H, OH, halide, amine, optionally substituted $C_{1-6}$ alkyl, optionally substituted $C_{2-6}$ alkenyl, optionally substituted $C_{2-6}$ alkynyl, optionally substituted $C_3$-$C_8$ cycloalkyl, optionally substituted $C_1$-$C_8$ heteroalkyl, optionally substituted $C_3$-$C_8$ heterocycloalkyl, optionally substituted $C_{1-6}$ perhaloalkyl, optionally substituted $C_{1-6}$ alkoxy, optionally substituted aryl, optionally substituted aryloxy, optionally substituted heteroaryl, optionally substituted heteroaryloxy, optionally substituted benzyl, carboxylic acid, C(=O)O($C_1$-$C_4$)alkyl, —C(=O)$NH_2$, —C(=O)NH($C_1$-$C_4$)alkyl, —C(=O)N(($C_1$-$C_4$)alkyl)$_2$, —$SO_2NH_2$, and —C(=NH)$NH_2$;

each occurrence of R⁴ is independently selected from the group consisting of H, optionally substituted $C_{1-6}$ alkyl, optionally substituted $C_3$-$C_8$ cycloalkyl, optionally substituted $C_1$-$C_8$ heteroalkyl, and optionally substituted $C_3$-$C_8$ heterocycloalkyl; and each occurrence of R⁵ is independently selected from the group consisting of H and optionally substituted $C_{1-6}$ alkyl, halide, nitro, and nitrile.

The invention further provides a compound of formula (I) or (I'), or a salt, solvate, enantiomer, diastereoisomer or tautomer thereof:

wherein:

each occurrence of R¹ is independently selected from the group consisting of H, halide, amine, sulfonamide, nitro, cyano, optionally substituted $C_{1-6}$ alkyl, optionally substituted $C_{2-6}$ alkenyl, optionally substituted $C_3$-$C_8$ heterocycloalkyl, optionally substituted $C_{1-6}$ alkoxy, optionally substituted aryloxy, optionally substituted heteroaryl, and optionally substituted heteroaryloxy;

each occurrence of R² is independently selected from the group consisting of H, halide, optionally substituted $C_{1-6}$ alkyl, optionally substituted $C_{2-6}$ alkenyl, optionally substituted $C_{2-6}$ alkynyl, optionally substituted $C_3$-$C_8$ cycloalkyl, optionally substituted $C_1$-$C_8$ heteroalkyl, optionally substituted $C_3$-$C_8$ heterocycloalkyl, and optionally substituted $C_{1-6}$ perhaloalkyl;

each occurrence of R³ is independently selected from the group selected from the group consisting of H and optionally substituted $C_1$-$C_6$ alkyl;

each occurrence of R⁴ is independently selected from the group consisting of H, optionally substituted $C_{1-6}$ alkyl, optionally substituted $C_3$-$C_8$ cycloalkyl, optionally substituted $C_1$-$C_8$ heteroalkyl, and optionally substituted $C_3$-$C_8$ heterocycloalkyl.

The invention further provides a compound, or a salt, solvate, enantiomer, diastereoisomer or tautomer thereof, selected from the group consisting of:

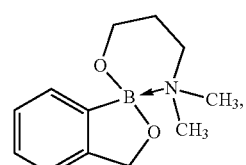

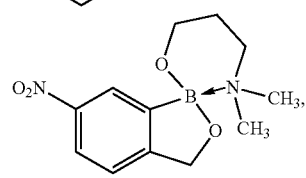

-continued
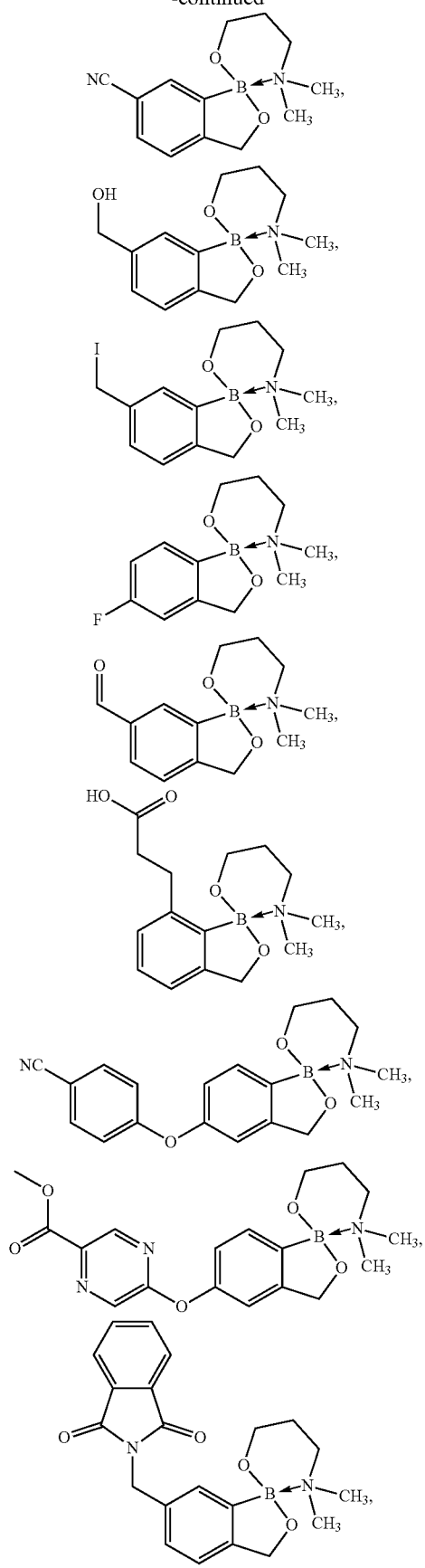
-continued
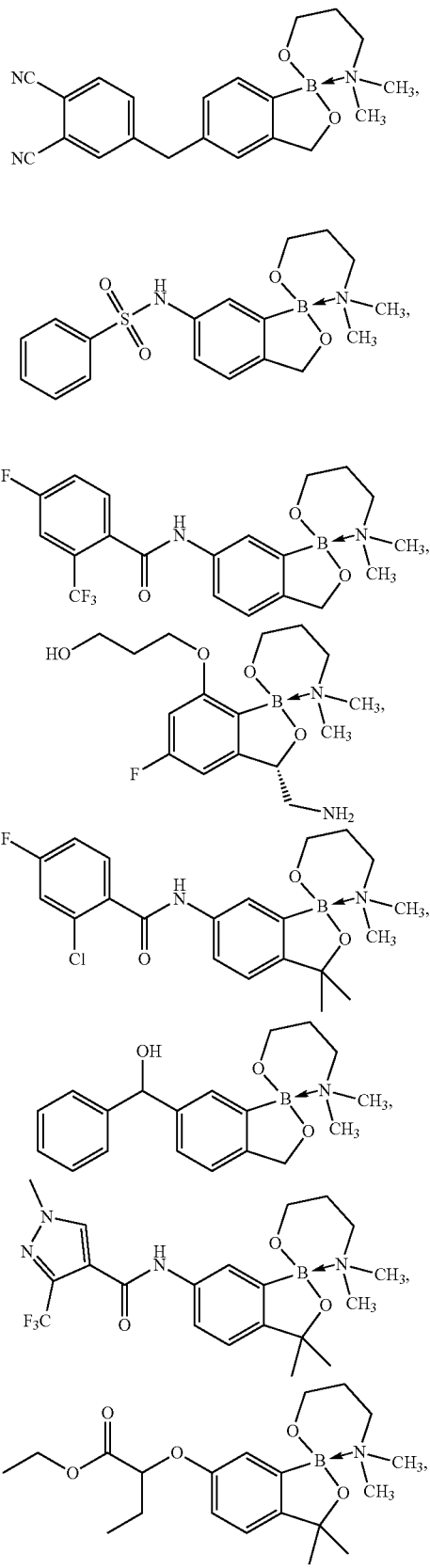

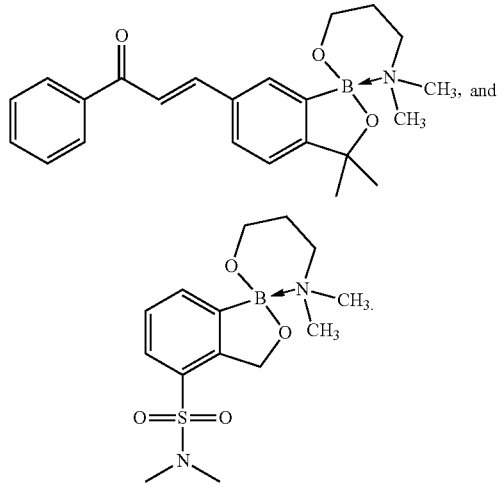

In certain embodiments, each occurrence of $R^1$ is independently selected from the group consisting of OMe, $C_{1-6}$ alkoxy, $NO_2$, $CH_2OH$, $CH_2I$, CHO, CN, F, Cl, Br, I, $CF_3$, $CH_2Cl$, $CH_2Br$, $C_{1-6}$ carboxylate, $C_{1-6}$ thioether

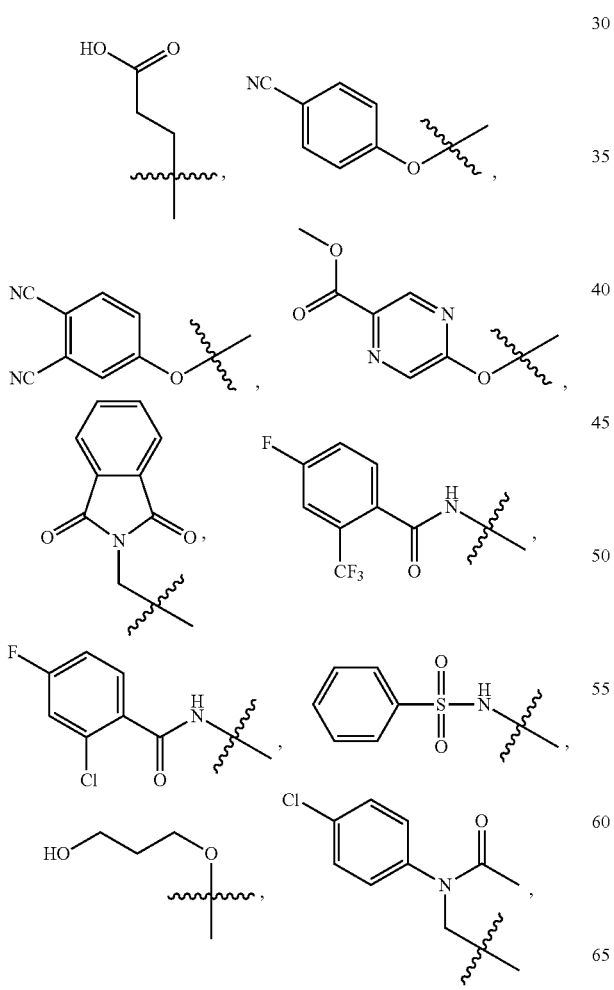

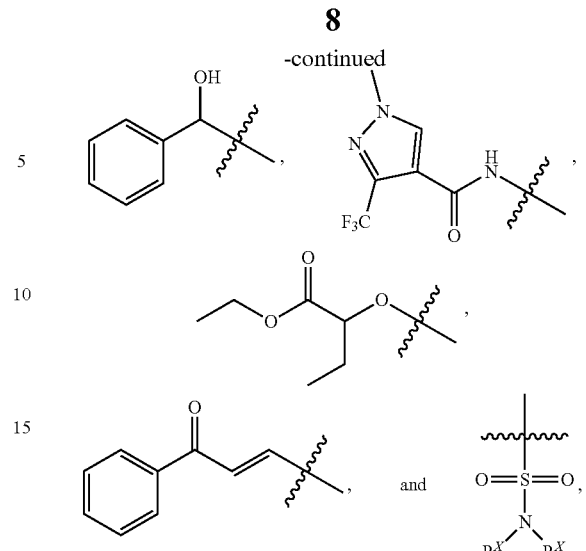

wherein each occurrence of $R^x$ is independently selected from the group consisting of H and optionally substituted $C_{1-6}$ alkyl.

In certain embodiments, each occurrence of $R^1$ is independently selected from the group consisting of H, $NO_2$, $CH_2OH$, $CH_2I$, CHO, CN, F,

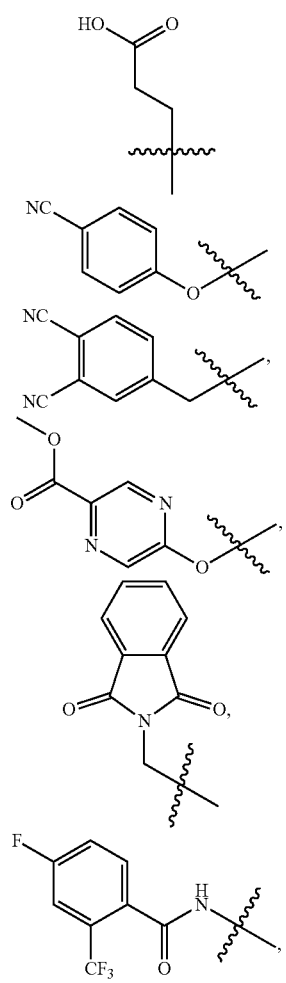

-continued

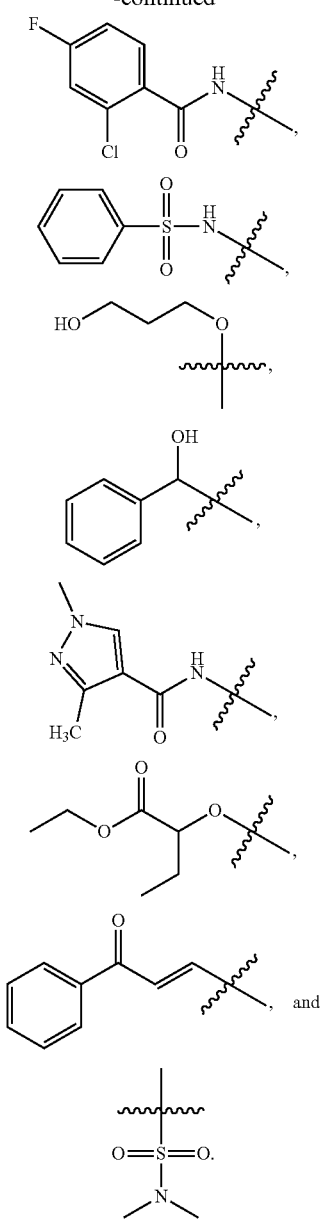

In certain embodiments, each occurrence of R³ is independently selected from the group consisting of H, optionally substituted C₁₋₆ alkyl, optionally substituted C₁₋₆ alkyl cyano, optionally substituted C₁₋₆ nitroalkyl, optionally substituted C₁₋₆ aminoalkyl,

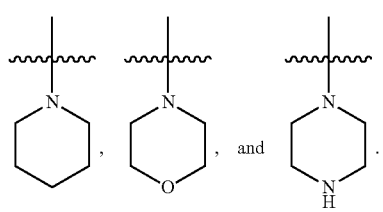

In certain embodiments, the compound is a compound of formula (Ia) or (Ia'):

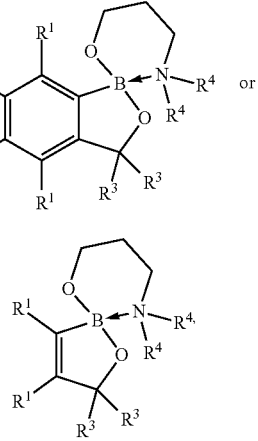

(Ia)

(Ia')

wherein:
each occurrence of R¹ is independently selected from the group consisting of H, halide, amine, sulfonamide, nitro, cyano, optionally substituted C₁₋₆ alkyl, optionally substituted C₂₋₆ alkenyl, optionally substituted C₃-C₈ heterocycloalkyl, optionally substituted C₁₋₆ alkoxy, optionally substituted aryloxy, optionally substituted heteroaryl, and optionally substituted heteroaryloxy;
each occurrence of R³ is independently selected from the group consisting of H and optionally substituted methyl;
each occurrence of R⁴ is independently selected from the group consisting of H, optionally substituted C₁₋₆ alkyl, optionally substituted C₃-C₈ cycloalkyl, optionally substituted C₁-C₈ heteroalkyl, and optionally substituted C₃-C₈ heterocycloalkyl.

In certain embodiments, the compound is a compound of formula (IIa) or (IIa'):

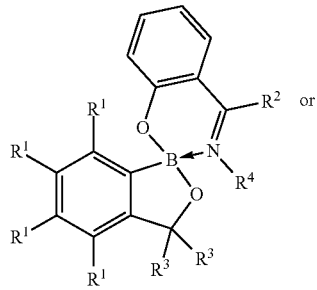

(IIa)

(IIa')

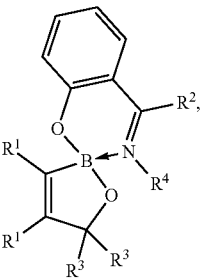

wherein R² is selected from the group consisting of H and methyl.

In certain embodiments, the compound of formula (IIa) is a compound selected from the group consisting of:

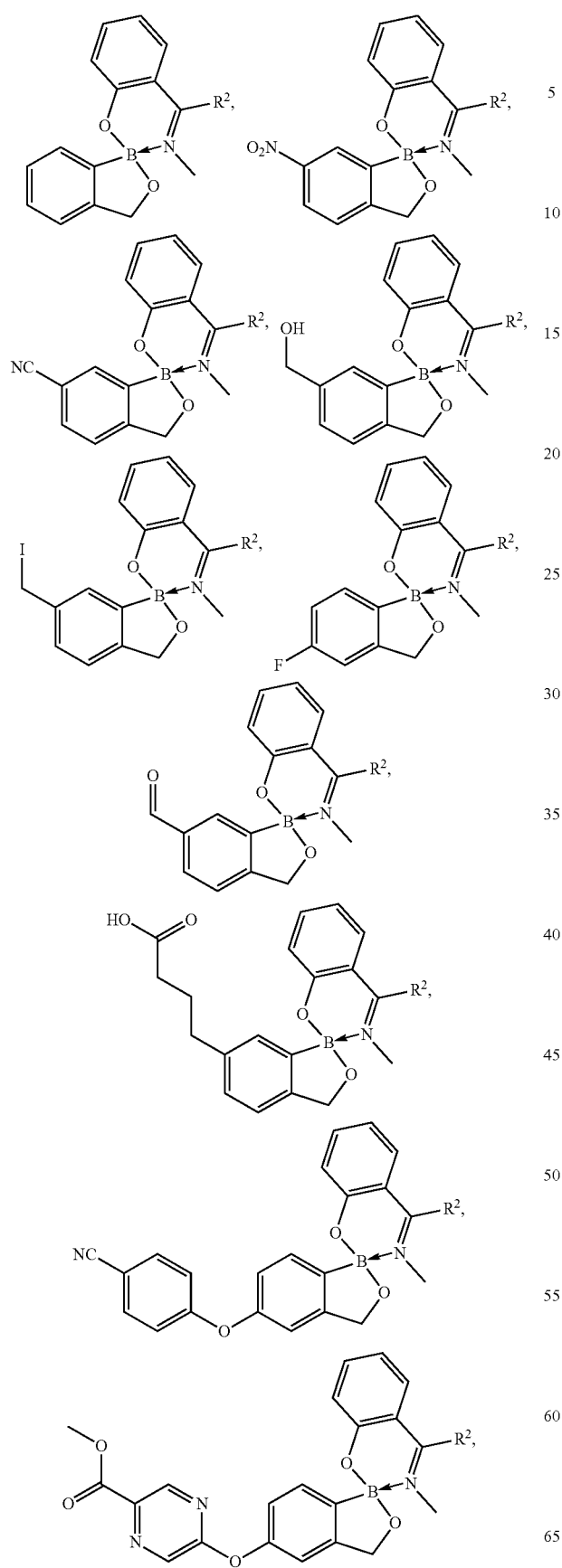
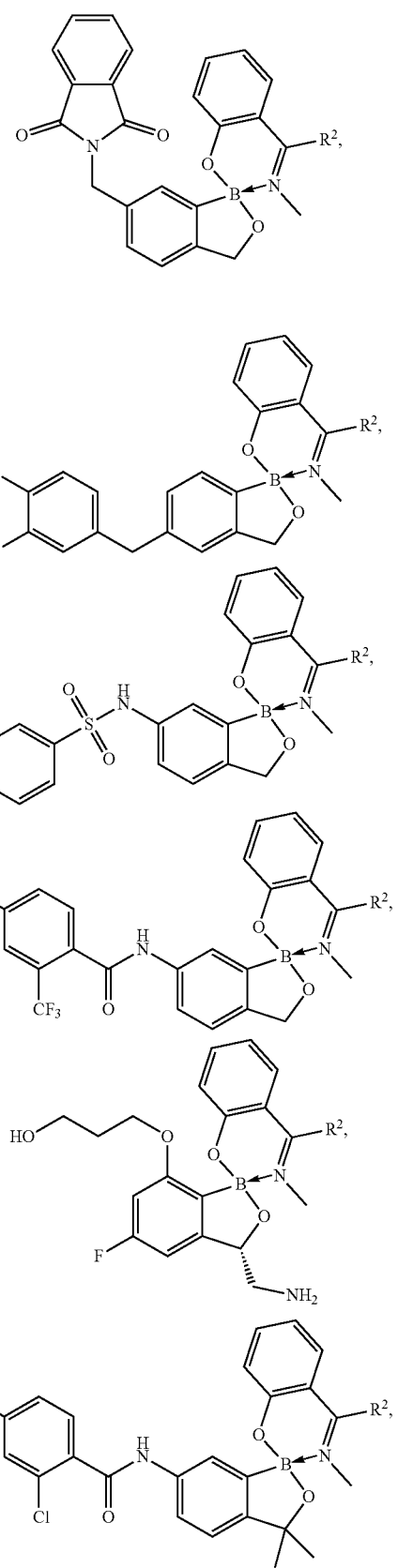

-continued

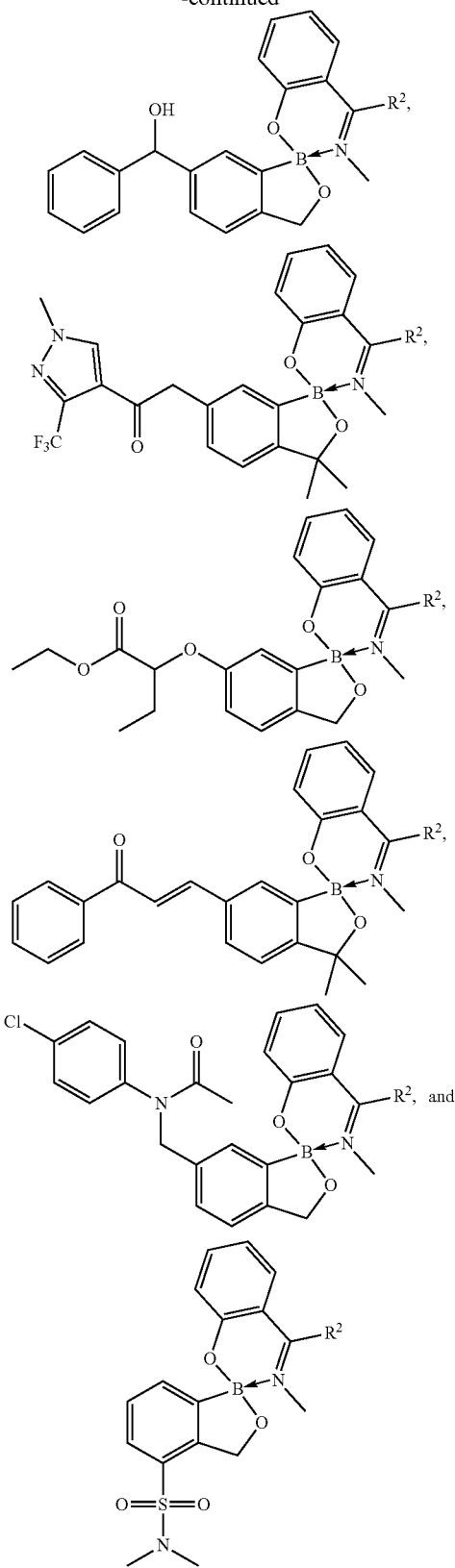

wherein R² is selected from the group consisting of H, optionally substituted C$_{1-6}$ alkyl, and optionally substituted C$_3$-C$_8$ cycloalkyl.

The invention further provides a method of protecting a boronic acid group.

In certain embodiments, the method comprises reacting a boronic acid containing compound with a compound of formula (III) or formula (IV):

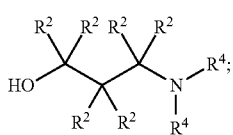

(III)

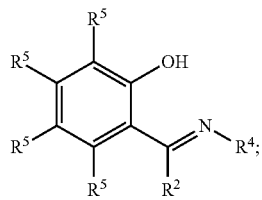

(IV)

wherein each occurrence of R² is independently selected from the group consisting of H, optionally substituted C$_{1-6}$ alkyl, halide, optionally substituted C$_{2-6}$ alkenyl, optionally substituted C$_{2-6}$ alkynyl, optionally substituted C$_3$-C$_8$ cycloalkyl, optionally substituted C$_1$-C$_8$ heteroalkyl, optionally substituted C$_3$-C$_8$ heterocycloalkyl, and optionally substituted C$_{1-6}$ perhaloalkyl;

each occurrence of R⁴ is independently selected from the group consisting of H, optionally substituted C$_{1-6}$ alkyl, optionally substituted C$_3$-C$_8$ cycloalkyl, optionally substituted C$_1$-C$_8$ heteroalkyl, and optionally substituted C$_3$-C$_8$ heterocycloalkyl; and each occurrence of R⁵ is independently selected from the group consisting of H, halide, nitro, nitrile and optionally substituted C$_{1-6}$ alkyl.

In certain embodiments, the boronic acid containing compound is a (benz)oxaborole.

In certain embodiments, the (benz)oxaborole is a compound of formula:

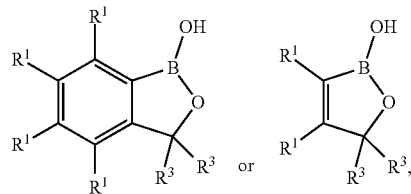

wherein:
each occurrence of R¹ is independently selected from the group consisting of H, OH, halide, amine, carboxylic acid, C(=O)O(C$_1$-C$_4$)alkyl, —C(=O)NH$_2$, —C(=O)NH(C$_1$-C$_4$)alkyl, —C(=O)N((C$_1$-C$_4$)alkyl)$_2$, —C(=NH)NH$_2$, phosphoric acid, phosphonate, sulfonamide, nitro, cyano, optionally substituted C$_{1-6}$ alkyl, optionally substituted C$_{2-6}$ alkenyl, optionally substituted C$_{2-6}$ alkynyl, optionally substituted C$_3$-C$_8$ cycloalkyl, optionally substituted C$_1$-C$_8$ heteroalkyl, optionally substituted C$_3$-C$_8$ heterocycloalkyl, optionally substituted C$_{1-6}$ perhaloalkyl, optionally substituted C$_{1-6}$ alkoxy, optionally substituted aryl, optionally substituted aryloxy, optionally substituted heteroaryl, optionally substituted heteroaryloxy, and optionally substituted benzyl; and each occurrence of $R^3$ is independently selected from the group consisting of H, OH, halide, amine, optionally substituted $C_{1-6}$ alkyl, optionally substituted $C_{2-6}$ alkenyl, optionally substituted $C_{2-6}$ alkynyl, optionally substituted $C_3$-$C_8$ cycloalkyl, optionally substituted $C_1$-$C_8$ heteroalkyl, optionally substituted $C_3$-$C_8$ heterocycloalkyl, optionally substituted $C_{1-6}$ perhaloalkyl, optionally substituted $C_{1-6}$ alkoxy, optionally substituted aryl, optionally substituted aryloxy, optionally substituted heteroaryl, optionally substituted heteroaryloxy, optionally substituted benzyl, carboxylic acid, C(=O)O($C_1$-$C_4$)alkyl, —C(=O)$NH_2$, —C(=O)NH($C_1$-$C_4$)alkyl, —C(=O)N(($C_1$-$C_4$)alkyl)$_2$, —$SO_2NH_2$, and —C(=NH)$NH_2$;

In certain embodiments, the boronic acid containing compound is selected from the group consisting of:

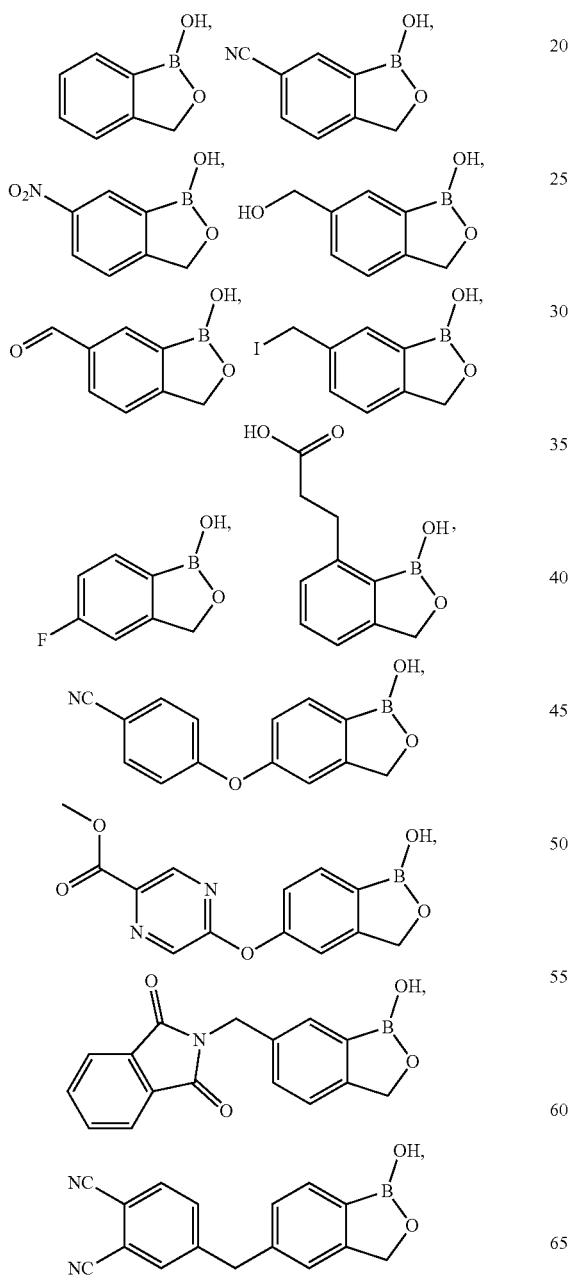

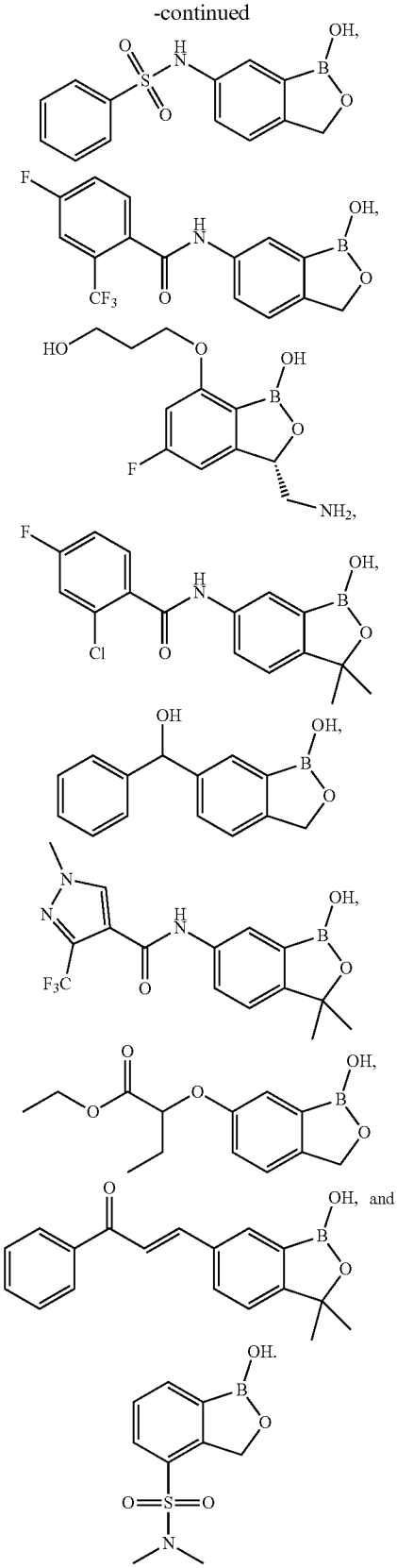

In certain embodiments, the method further comprises reacting the boronic acid containing compound with a compound of formula (IIIa) or formula (IVa):

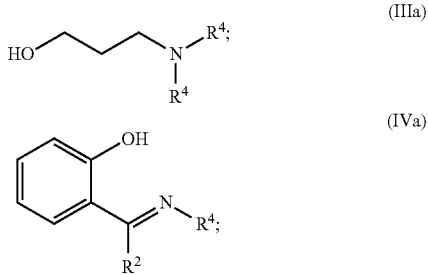

(IIIa)

(IVa)

The invention further provides a method of deprotecting a boronic acid containing compound.

In certain embodiments, the method comprises contacting a protected (benz)oxaborole compound of the invention with an acidic solution to yield a (benz)oxaborole of formula:

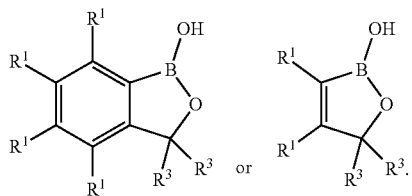

DETAILED DESCRIPTION OF THE INVENTION

The present invention relates in part to the unexpected discovery of protective groups that can be used to reversibly protect benzoxaboroles and yield the corresponding protected complexes. The invention further relates to the use of these protective groups to protect benzoxaboroles.

Definitions

As used herein, each of the following terms has the meaning associated with it in this section.

Unless defined otherwise, all technical and scientific terms used herein generally have the same meaning as commonly understood by one of ordinary skill in the art to which this invention belongs. Generally, the nomenclature used herein and the laboratory procedures in separation science, organometallic chemistry, inorganic chemistry, and organic chemistry are those well-known and commonly employed in the art.

As used herein, the articles "a" and "an" refer to one or to more than one (i.e., to at least one) of the grammatical object of the article. By way of example, "an element" means one element or more than one element.

As used herein, the term "about" is understood by persons of ordinary skill in the art and varies to some extent on the context in which it is used. As used herein when referring to a measurable value such as an amount, a temporal duration, and the like, the term "about" is meant to encompass variations of 20% or ±10%, more preferably +5%, even more preferably +1%, and still more preferably ±0.1% from the specified value, as such variations are appropriate to perform the disclosed methods.

As used herein, the term "alkenyl," employed alone or in combination with other terms, means, unless otherwise stated, a stable monounsaturated or di-unsaturated straight chain or branched chain hydrocarbon group having the stated number of carbon atoms. Examples include vinyl, propenyl (or allyl), crotyl, isopentenyl, butadienyl, 1,3-pentadienyl, 1,4-pentadienyl, and the higher homologs and isomers. A functional group representing an alkene is exemplified by —CH$_2$—CH=CH$_2$.

As used herein, the term "alkoxy" employed alone or in combination with other terms means, unless otherwise stated, an alkyl group having the designated number of carbon atoms, as defined above, connected to the rest of the molecule via an oxygen atom, such as, for example, methoxy, ethoxy, 1-propoxy, 2-propoxy (isopropoxy) and the higher homologs and isomers. A specific example is ($C_1$-$C_3$)alkoxy, such as, but not limited to, ethoxy and methoxy.

As used herein, the term "alkyl," by itself or as part of another substituent means, unless otherwise stated, a straight or branched chain hydrocarbon having the number of carbon atoms designated (i.e., $C_1$-$C_{10}$ means one to ten carbon atoms) and includes straight, branched chain, or cyclic substituent groups. Examples include methyl, ethyl, propyl, isopropyl, butyl, isobutyl, tert-butyl, pentyl, neopentyl, hexyl, and cyclopropylmethyl. A selected example is ($C_1$-$C_6$)alkyl, such as, but not limited to, ethyl, methyl, isopropyl, isobutyl, n-pentyl, n-hexyl and cyclopropylmethyl.

As used herein, the term "alkynyl," employed alone or in combination with other terms, means, unless otherwise stated, a stable straight chain or branched chain hydrocarbon group with a triple carbon-carbon bond, having the stated number of carbon atoms. Non-limiting examples include ethynyl and propynyl, and the higher homologs and isomers. The term "propargylic" refers to a group exemplified by —CH$_2$—C≡CH. The term "homopropargylic" refers to a group exemplified by —CH$_2$CH$_2$—C≡CH. The term "substituted propargylic" refers to a group exemplified by —CR$_2$—C≡CR', wherein each occurrence of R' is independently H, alkyl, substituted alkyl, alkenyl or substituted alkenyl, with the proviso that at least one R' group is not hydrogen. The term "substituted homopropargylic" refers to a group exemplified by —CR'$_2$CR'$_2$—C≡CR', wherein each occurrence of R' is independently H, alkyl, substituted alkyl, alkenyl or substituted alkenyl, with the proviso that at least one R' group is not hydrogen.

As used herein, the term "aromatic" refers to a carbocycle or heterocycle with one or more polyunsaturated rings and having aromatic character, i.e. having (4n+2) delocalized π (pi) electrons, where n is an integer.

As used herein, the term "aryl," employed alone or in combination with other terms, means, unless otherwise stated, a carbocyclic aromatic system containing one or more rings (typically one, two or three rings) wherein such rings may be attached together in a pendent manner, such as a biphenyl, or may be fused, such as naphthalene. Examples include phenyl, anthracyl, and naphthyl.

As used herein, the term "aryl-($C_1$-$C_3$)alkyl" refers to a functional group wherein a one to three carbon alkylene chain is attached to an aryl group, e.g., —CH$_2$CH$_2$-phenyl or —CH$_2$-phenyl (benzyl). Specific examples are aryl-CH$_2$— and aryl-CH(CH$_3$)—. The term "substituted aryl-($C_1$-$C_3$)alkyl" refers to an aryl-($C_1$-$C_3$)alkyl functional group in which the aryl group is substituted. A specific example is substituted aryl(CH$_2$)—. Similarly, the term "heteroaryl-($C_1$-$C_3$)alkyl" refers to a functional group wherein a one to three carbon alkylene chain is attached to a heteroaryl group, e.g., —CH$_2$CH$_2$-pyridyl. A specific example is heteroaryl-(CH$_2$)—. The term "substituted heteroaryl-($C_1$-$C_3$)alkyl" refers to a heteroaryl-($C_1$-$C_3$)alkyl functional group in which the heteroaryl group is substituted. A specific example is substituted heteroaryl-$(CH_2)$—.

As used herein, the term "cycloalkyl," by itself or as part of another substituent refers to, unless otherwise stated, a cyclic chain hydrocarbon having the number of carbon atoms designated (i.e., $C_3$-$C_6$ refers to a cyclic group comprising a ring group consisting of three to six carbon atoms) and includes straight, branched chain or cyclic substituent groups. Examples include cyclopropyl, cyclobutyl, cyclopentyl, cyclohexyl, cycloheptyl, and cyclooctyl. Other examples are ($C_3$-$C_6$)cycloalkyl, such as, but not limited to, cyclopropyl, cyclobutyl, cyclopentyl and cyclohexyl.

As used herein, the term "halide" refers to a halogen atom bearing a negative charge. The halide anions are fluoride ($F^-$), chloride ($Cl^-$), bromide ($Br^-$), and iodide ($I^-$).

As used herein, the term "halo" or "halogen" alone or as part of another substituent refers to, unless otherwise stated, a fluorine, chlorine, bromine, or iodine atom.

As used herein, the term "heteroalkenyl" by itself or in combination with another term refers to, unless otherwise stated, a stable straight or branched chain monounsaturated or diunsaturated hydrocarbon group consisting of the stated number of carbon atoms and one or two heteroatoms selected from the group consisting of O, N, and S, and wherein the nitrogen and sulfur atoms may optionally be oxidized and the nitrogen heteroatom may optionally be quaternized. Up to two heteroatoms may be placed consecutively. Examples include —CH=CH—O—$CH_3$, —CH=CH—$CH_2$—OH, —$CH_2$—CH=N—$OCH_3$, —CH=CH—N($CH_3$)—$CH_3$, and —$CH_2$—CH=CH—$CH_2$—SH.

As used herein, the term "heteroalkyl" by itself or in combination with another term refers to, unless otherwise stated, a stable straight or branched chain alkyl group consisting of the stated number of carbon atoms and one or two heteroatoms selected from the group consisting of O, N, and S, and wherein the nitrogen and sulfur atoms may be optionally oxidized and the nitrogen heteroatom may be optionally quaternized. The heteroatom(s) may be placed at any position of the heteroalkyl group, including between the rest of the heteroalkyl group and the fragment to which it is attached, as well as attached to the most distal carbon atom in the heteroalkyl group. Examples include: —O—$CH_2$—$CH_2$—$CH_3$, —$CH_2$—$CH_2$—$CH_2$—OH, —$CH_2$—$CH_2$—NH—$CH_3$, —$CH_2$—S—$CH_2$—$CH_3$, and —$CH_2CH_2$—S(=O)—$CH_3$. Up to two heteroatoms may be consecutive, such as, for example, —$CH_2$—NH—$OCH_3$, or —$CH_2$—$CH_2$—S—S—$CH_3$.

As used herein, the term "heterocycle" or "heterocyclyl" or "heterocyclic" by itself or as part of another substituent refers to, unless otherwise stated, an unsubstituted or substituted, stable, mono- or multi-cyclic heterocyclic ring system that consists of carbon atoms and at least one heteroatom selected from the group consisting of N, O, and S, and wherein the nitrogen and sulfur heteroatoms may be optionally oxidized, and the nitrogen atom may be optionally quaternized. The heterocyclic system may be attached, unless otherwise stated, at any heteroatom or carbon atom that affords a stable structure. A heterocycle may be aromatic or non-aromatic in nature. In certain embodiments, the heterocycle is a heteroaryl.

As used herein, the term "heteroaryl" or "heteroaromatic" refers to a heterocycle having aromatic character. A polycyclic heteroaryl may include one or more rings that are partially saturated. Examples include tetrahydroquinoline and 2,3-dihydrobenzofuryl.

Examples of non-aromatic heterocycles include monocyclic groups such as aziridine, oxirane, thiirane, azetidine, oxetane, thietane, pyrrolidine, pyrroline, imidazoline, pyrazolidine, dioxolane, sulfolane, 2,3-dihydrofuran, 2,5-dihydrofuran, tetrahydrofuran, thiophane, piperidine, 1,2,3,6-tetrahydropyridine, 1,4-dihydropyridine, piperazine, morpholine, thiomorpholine, pyran, 2,3-dihydropyran, tetrahydropyran, 1,4-dioxane, 1,3-dioxane, homopiperazine, homopiperidine, 1,3-dioxepane, 4,7-dihydro-1,3-dioxepin and hexamethyleneoxide.

Examples of heteroaryl groups include pyridyl, pyrazinyl, pyrimidinyl (such as, but not limited to, 2- and 4-pyrimidinyl), pyridazinyl, thienyl, furyl, pyrrolyl, imidazolyl, thiazolyl, oxazolyl, pyrazolyl, isothiazolyl, 1,2,3-triazolyl, 1,2,4-triazolyl, 1,3,4-triazolyl, tetrazolyl, 1,2,3-thiadiazolyl, 1,2,3-oxadiazolyl, 1,3,4-thiadiazolyl and 1,3,4-oxadiazolyl.

Examples of polycyclic heterocycles include indolyl (such as, but not limited to, 3-, 4-, 5-, 6- and 7-indolyl), indolinyl, quinolyl, tetrahydroquinolyl, isoquinolyl (such as, but not limited to, 1- and 5-isoquinolyl), 1,2,3,4-tetrahydroisoquinolyl, cinnolinyl, quinoxalinyl (such as, but not limited to, 2- and 5-quinoxalinyl), quinazolinyl, phthalazinyl, 1,8-naphthyridinyl, 1,4-benzodioxanyl, coumarin, dihydrocoumarin, 1,5-naphthyridinyl, benzofuryl (such as, but not limited to, 3-, 4-, 5-, 6- and 7-benzofuryl), 2,3-dihydrobenzofuryl, 1,2-benzisoxazolyl, benzothienyl (such as, but not limited to, 3-, 4-, 5-, 6-, and 7-benzothienyl), benzoxazolyl, benzothiazolyl (such as, but not limited to, 2-benzothiazolyl and 5-benzothiazolyl), purinyl, benzimidazolyl, benztriazolyl, thioxanthinyl, carbazolyl, carbolinyl, acridinyl, pyrrolizidinyl, and quinolizidinyl.

The aforementioned listing of heterocyclic and heteroaryl moieties is intended to be representative and not limiting.

As used herein, the term "substituted" refers to that an atom or group of atoms has replaced hydrogen as the substituent attached to another group.

As used herein, the term "substituted", such as in "substituted alkyl," "substituted cycloalkyl," "substituted alkenyl" or "substituted alkynyl" refers to alkyl, cycloalkyl, alkenyl or alkynyl, as defined above, substituted by one, two or three substituents selected from the group consisting of halogen, —OH, alkoxy, tetrahydro-2-H-pyranyl, —$NH_2$, —N($CH_3$)$_2$, (1-methyl-imidazol-2-yl), pyridin-2-yl, pyridin-3-yl, pyridin-4-yl, —C(=O)OH, trifluoromethyl, —C≡N, —C(=O)O($C_1$-$C_4$)alkyl, —C(=O)$NH_2$, —C(=O)NH($C_1$-$C_4$)alkyl, —C(=O)N(($C_1$-$C_4$)alkyl)$_2$, —$SO_2NH_2$, —C(=NH)$NH_2$, and —$NO_2$, preferably containing one or two substituents selected from halogen, —OH, alkoxy, —$NH_2$, trifluoromethyl, —N($CH_3$)$_2$, and —C(=O)OH, more preferably selected from halogen, alkoxy and —OH. Examples of substituted alkyls include, but are not limited to, 2,2-difluoropropyl, 2-carboxycyclopentyl and 3-chloropropyl.

For aryl, aryl-($C_1$-$C_3$)alkyl and heterocyclic groups, the term "substituted" as applied to the rings of these groups refers to any level of substitution, namely mono-, di-, tri-, tetra-, or penta-substitution, where such substitution is permitted. The substituents are independently selected, and substitution may be at any chemically accessible position. In certain embodiments, the substituents vary in number between one and four. In another embodiment, the substituents vary in number between one and three. In yet another embodiment, the substituents vary in number between one and two. In yet another embodiment, the substituents are independently selected from the group consisting of $C_{1-6}$ alkyl, —OH, $C_{1-6}$ alkoxy, halo, amino, acetamido and nitro.

As used herein, where a substituent is an alkyl or alkoxy group, the carbon chain may be branched, straight or cyclic.

Ranges: throughout this disclosure, various aspects of the invention can be presented in a range format. It should be understood that the description in range format is merely for convenience and brevity and should not be construed as an inflexible limitation on the scope of the invention. Accordingly, the description of a range should be considered to have specifically disclosed all the possible sub-ranges as well as individual numerical values within that range. For example, description of a range such as from 1 to 6 should be considered to have specifically disclosed sub-ranges such as from 1 to 3, from 1 to 4, from 1 to 5, from 2 to 4, from 2 to 6, from 3 to 6 etc., as well as individual and partial numbers within that range, for example, 1, 2, 2.7, 3, 4, 5, 5.3, and 6. This applies regardless of the breadth of the range.

Compounds

The invention provides protective groups that form cyclic complexes with benzoxaboroles, thus protecting the B—OH functionality. It should be noted that the present disclosure is exemplified with benzoxaboroles and their protected forms, but is equally applicable to oxaboroles and their protected forms. As used herein, the term "(benz)oxaborole" refers to benzoxaborole and/or oxaborole. In certain non-limiting embodiments, the double bond in the oxaborole ring is saturated.

In one aspect, the invention provides a compound of formula (I) or (I'), or a salt, solvate, enantiomer, diastereoisomer or tautomer thereof:

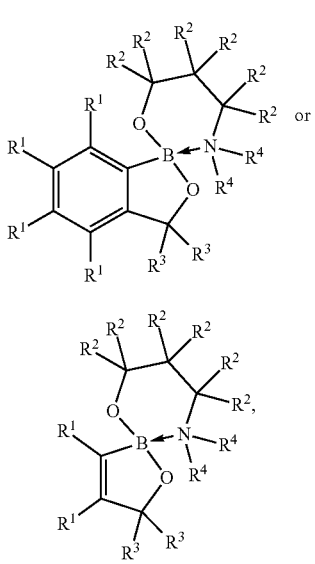

wherein;

each occurrence of $R^1$ is independently selected from the group consisting of H, OH, halide, amine, carboxylic acid, $C(=O)O(C_1-C_4)$alkyl, $-C(=O)NH_2$, $-C(=O)NH(C_1-C_4)$alkyl, $-C(=O)N((C_1-C_4)$alkyl$)_2$, $-C(=NH)NH_2$, phosphoric acid, phosphonate, sulfonamide, nitro, cyano, optionally substituted $C_{1-6}$ alkyl, optionally substituted $C_{2-6}$ alkenyl, optionally substituted $C_{2-6}$ alkynyl, optionally substituted $C_3$-$C_8$ cycloalkyl, optionally substituted $C_1$-$C_8$ heteroalkyl, optionally substituted $C_3$-$C_8$ heterocycloalkyl, optionally substituted $C_{1-6}$ perhaloalkyl, optionally substituted $C_{1-6}$ alkoxy, optionally substituted aryl, optionally substituted aryloxy, optionally substituted heteroaryl, optionally substituted heteroaryloxy, and optionally substituted benzyl;

each occurrence of $R^2$ is independently selected from the group consisting of H, optionally substituted $C_{1-6}$ alkyl, optionally substituted $C_{2-6}$ alkenyl, optionally substituted $C_{2-6}$ alkynyl, optionally substituted $C_3$-$C_8$ cycloalkyl, optionally substituted $C_1$-$C_8$ heteroalkyl, optionally substituted $C_3$-$C_8$ heterocycloalkyl, and optionally substituted $C_{1-6}$ perhaloalkyl;

each occurrence of $R^3$ is independently selected from the group consisting of H, OH, halide, amine, optionally substituted $C_{1-6}$ alkyl, optionally substituted $C_{2-6}$ alkenyl, optionally substituted $C_{2-6}$ alkynyl, optionally substituted $C_3$-$C_8$ cycloalkyl, optionally substituted $C_1$-$C_8$ heteroalkyl, optionally substituted $C_3$-$C_8$ heterocycloalkyl, optionally substituted $C_{1-6}$ perhaloalkyl, optionally substituted $C_{1-6}$ alkoxy, optionally substituted aryl, optionally substituted aryloxy, optionally substituted heteroaryl, optionally substituted heteroaryloxy, optionally substituted benzyl, carboxylic acid, $C(=O)O(C_1-C_4)$alkyl, $-C(=O)NH_2$, $-C(=O)NH(C_1-C_4)$alkyl, $-C(=O)N((C_1-C_4)$alkyl$)_2$, $-SO_2NH_2$, and $-C(=NH)NH_2$; and each occurrence of $R^4$ is independently selected from the group consisting of H, optionally substituted $C_{1-6}$ alkyl, optionally substituted $C_3$-$C_8$ cycloalkyl, optionally substituted $C_1$-$C_8$ heteroalkyl, and optionally substituted $C_3$-$C_8$ heterocycloalkyl.

In certain embodiments, each occurrence of $R^1$ is independently selected from the group consisting of OMe, $C_{1-6}$ alkoxy, $NO_2$, $CH_2OH$, $CH_2I$, CHO, CN, F, Cl, Br, I, $CF_3$, $CH_2Cl$, $CH_2Br$, $C_{1-6}$ carboxylate, $C_{1-6}$ thioether

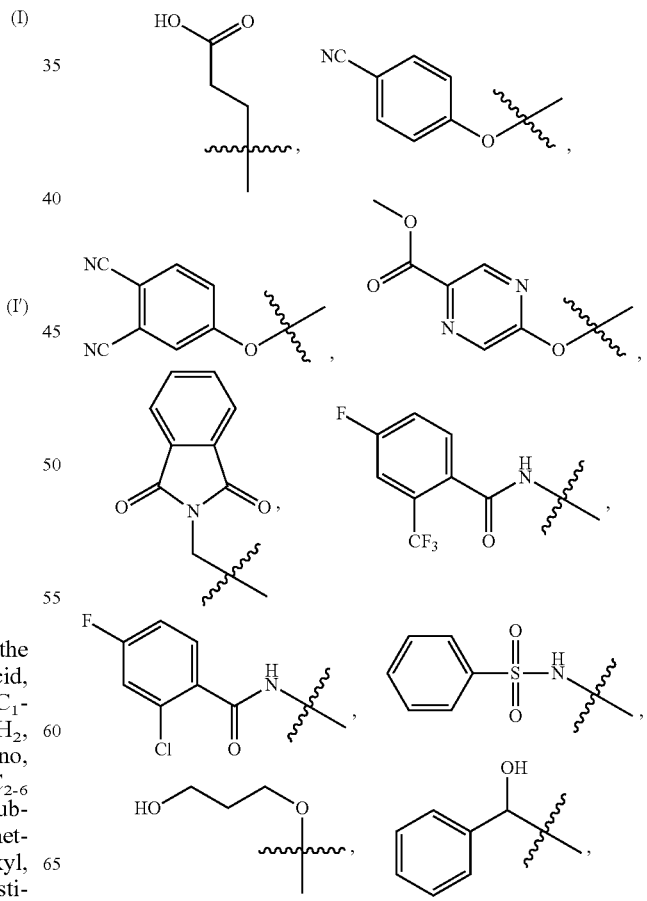

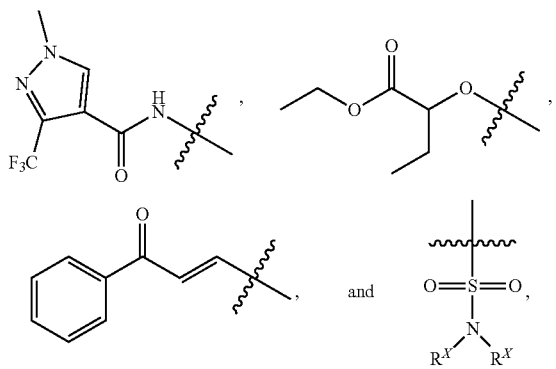

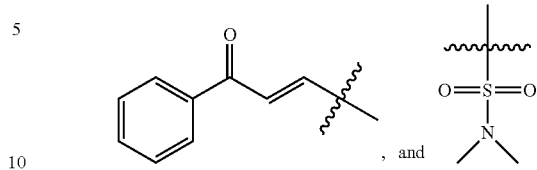

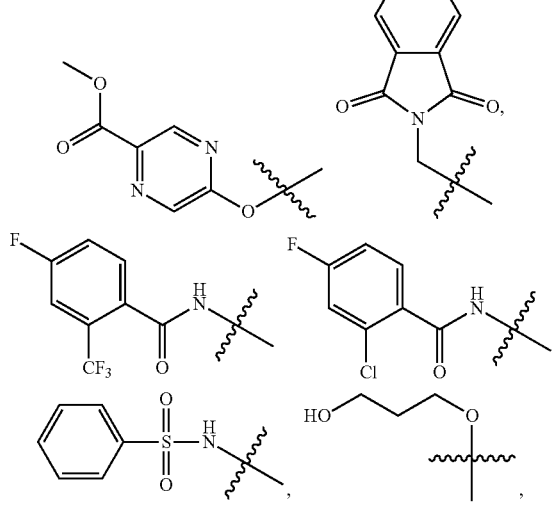

wherein each occurrence of $R^x$ is independently selected from the group consisting of H and optionally substituted $C_{1-6}$ alkyl.

In certain embodiments, each occurrence of $R^1$ is independently selected from the group consisting of H, $C_{1-6}$ alkoxy $NO_2$, $CH_2OH$, $CH_2I$, CHO, CN, F,

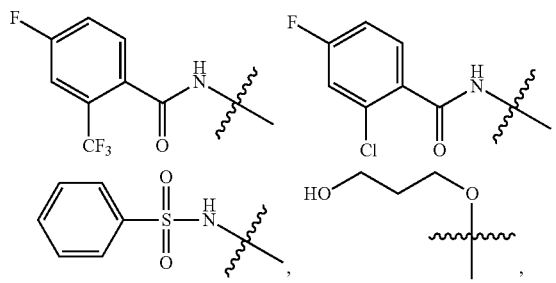

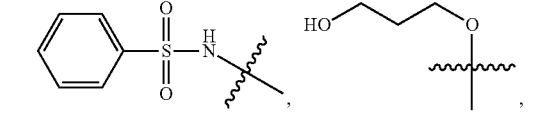

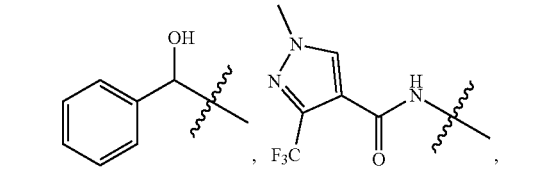

In certain embodiments, each occurrence of $R^1$ is independently selected from the group consisting of H, halide, amine, sulfonamide, nitro, cyano, optionally substituted $C_{1-6}$ alkyl, optionally substituted $C_{2-6}$ alkenyl, optionally substituted $C_3$-$C_8$ heterocycloalkyl, optionally substituted $C_{1-6}$ alkoxy, optionally substituted aryloxy, optionally substituted heteroaryl, optionally substituted heteroaryloxy, and optionally substituted benzyl.

In certain embodiments, each occurrence of $R^3$ is independently selected from the group consisting of H, optionally substituted $C_{1-6}$ alkyl, optionally substituted $C_{1-6}$ alkyl cyano, optionally substituted $C_{1-6}$ nitroalkyl, optionally substituted $C_{1-6}$ aminoalkyl,

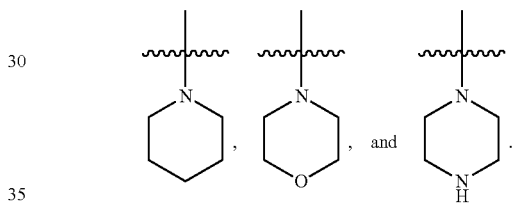

In certain embodiments, each occurrence of $R^3$ is independently selected from the group consisting of H and optionally substituted $C_1$-$C_6$ alkyl.

In certain embodiments, $R^3$ is

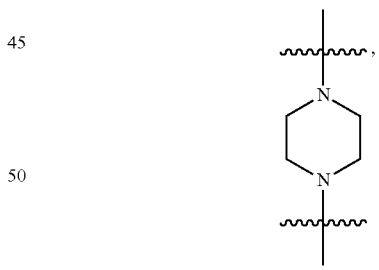

wherein both nitrogens on the piperazine are bound to independently selected compounds of formula (I) or (I'), thereby linking two compounds of formula (I) or (I') through the $R_3$ substituent.

In certain embodiments, each occurrence of $R^4$ is independently selected from the group consisting of H, optionally substituted $C_{1-6}$ alkyl, optionally substituted $C_3$-$C_8$ cycloalkyl, optionally substituted $C_1$-$C_8$ heteroalkyl, and optionally substituted $C_3$-$C_8$ heterocycloalkyl.

In certain embodiments, the compound of formula (I) is a compound of formula (Ia) or (Ia'):

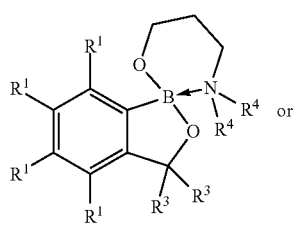
(Ia)
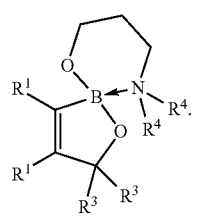
(Ia′)
In certain embodiments, each occurrence of R³ is independently selected from the group consisting of H and optionally substituted methyl.
In certain embodiments, the compound of formula (Ia) is a compound selected from the group consisting of:
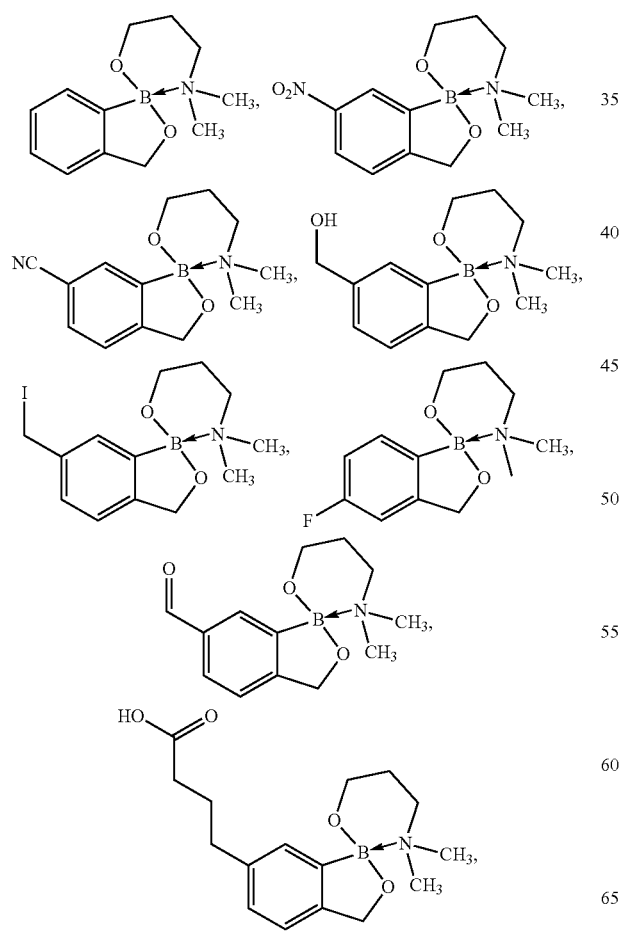
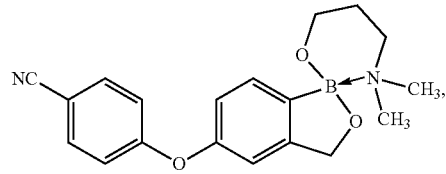
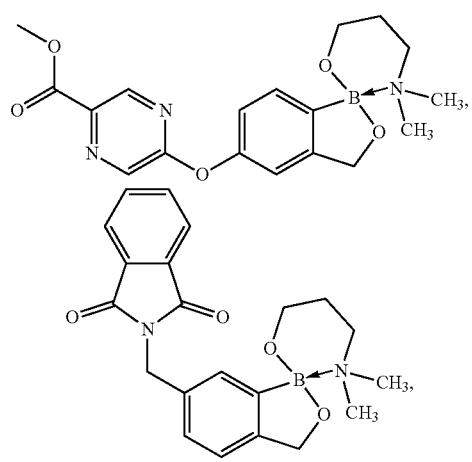
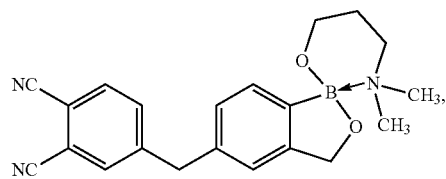
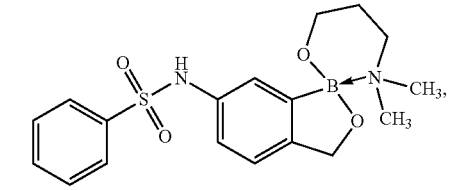
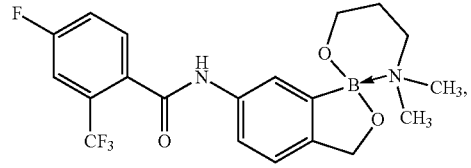
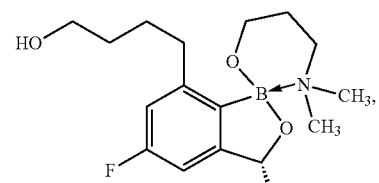
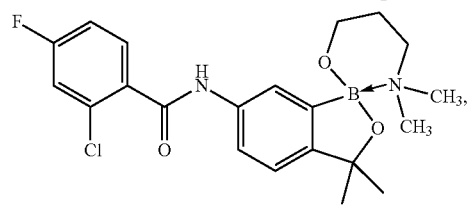

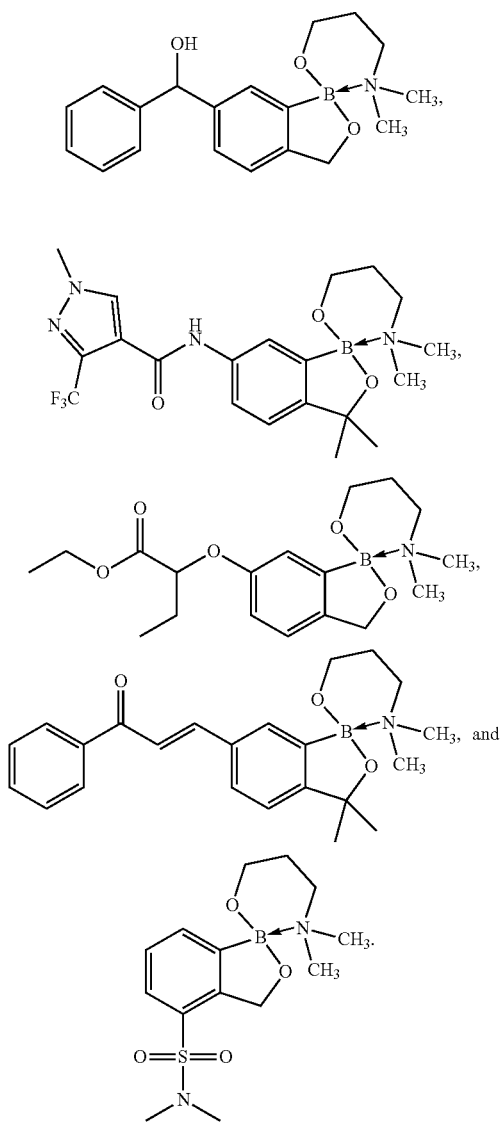

In another aspect, the invention provides a compound of formula (II) or (II'), or a salt, solvate, enantiomer, diastereoisomer or tautomer thereof:

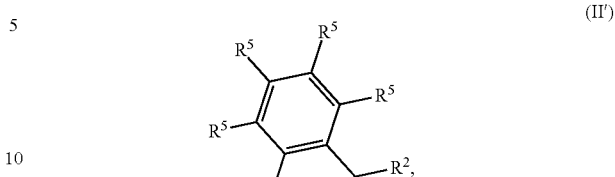

(II)

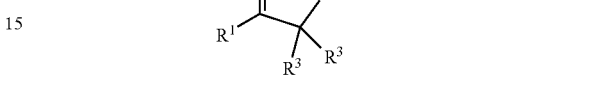

(II')

wherein;

each occurrence of $R^1$ is independently selected from the group consisting of H, OH, halide, amine, carboxylic acid, $C(=O)O(C_1-C_4)$alkyl, $-C(=O)NH_2$, $-C(=O)NH(C_1-C_4)$alkyl, $-C(=O)N((C_1-C_4)$alkyl$)_2$, $-C(=NH)NH_2$, phosphoric acid, phosphonate, sulfonamide, nitro, cyano, optionally substituted $C_{1-6}$ alkyl, optionally substituted $C_{2-6}$ alkenyl, optionally substituted $C_{2-6}$ alkynyl, optionally substituted $C_3-C_8$ cycloalkyl, optionally substituted $C_1-C_8$ heteroalkyl, optionally substituted $C_3-C_8$ heterocycloalkyl, optionally substituted $C_{1-6}$ perhaloalkyl, optionally substituted $C_{1-6}$ alkoxy, optionally substituted aryl, optionally substituted aryloxy, optionally substituted heteroaryl, optionally substituted heteroaryloxy, and optionally substituted benzyl;

$R^2$ is selected from the group consisting of H, halo, optionally substituted $C_{1-6}$ alkyl, optionally substituted $C_{2-6}$ alkenyl, optionally substituted $C_{2-6}$ alkynyl, optionally substituted $C_3-C_8$ cycloalkyl, optionally substituted $C_1-C_8$ heteroalkyl, optionally substituted $C_3-C_8$ heterocycloalkyl, and optionally substituted $C_{1-6}$ perhaloalkyl;

each occurrence of $R^3$ is independently selected from the group consisting of H, OH, halide, amine, optionally substituted $C_{1-6}$ alkyl, optionally substituted $C_{2-6}$ alkenyl, optionally substituted $C_{2-6}$ alkynyl, optionally substituted $C_3-C_8$ cycloalkyl, optionally substituted $C_1-C_8$ heteroalkyl, optionally substituted $C_3-C_8$ heterocycloalkyl, optionally substituted $C_{1-6}$ perhaloalkyl, optionally substituted $C_{1-6}$ alkoxy, optionally substituted aryl, optionally substituted aryloxy, optionally substituted heteroaryl, optionally substituted heteroaryloxy, optionally substituted benzyl, carboxylic acid, $C(=O)O(C_1-C_4)$alkyl, $-C(=O)NH_2$, $-C(=O)NH(C_1-C_4)$alkyl, $-C(=O)N((C_1-C_4)$alkyl$)_2$, $-SO_2NH_2$, and $-C(=NH)NH_2$;

$R^4$ is selected from the group consisting of H, optionally substituted $C_{1-6}$ alkyl, optionally substituted $C_3-C_8$ cycloalkyl, optionally substituted $C_1-C_8$ heteroalkyl, and optionally substituted $C_3-C_8$ heterocycloalkyl; and each occurrence of $R^5$ is independently selected from the group consisting of H and optionally substituted $C_{1-6}$ alkyl, halide, nitro and nitrile.

In certain embodiments, $R^1$ is selected from the group consisting of OMe, $C_{1-6}$ alkoxy, $NO_2$, $CH_2OH$, $CH_2I$, CHO, CN, F, Cl, Br, I, $CF_3$, $CH_2Cl$, $CH_2Br$, $C_{1-6}$ carboxylate, $C_{1-6}$ thioether

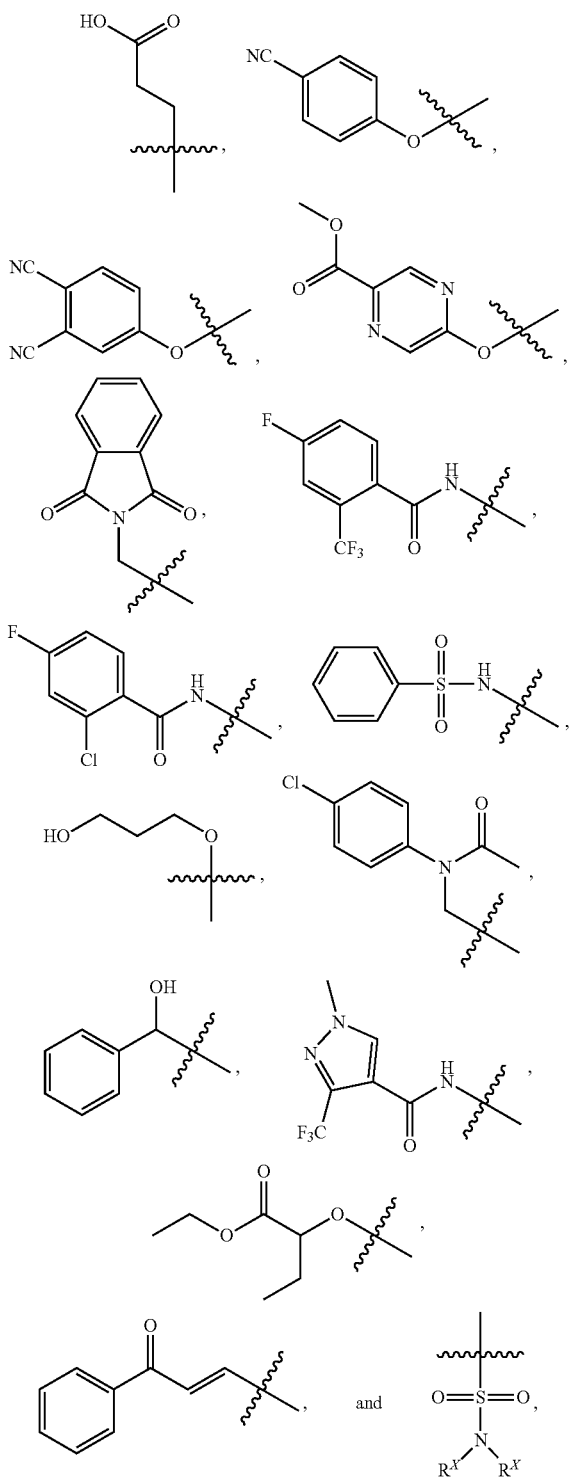

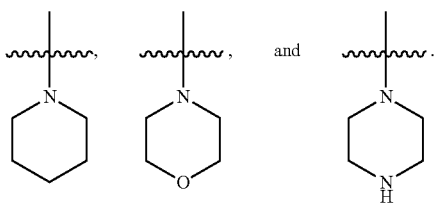

In certain embodiments, $R^3$ is

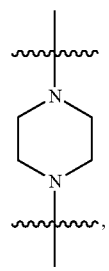 [SMILES: *N1CCN(*)CC1]

wherein both nitrogens on the piperazine are bound to independently selected compounds of formula (II) or (II'), thereby linking two compounds of formula (II) or (II') through the $R^3$ substituent.

In certain embodiments, the compound of formula (II) or (II') is a compound of formula (IIa) or

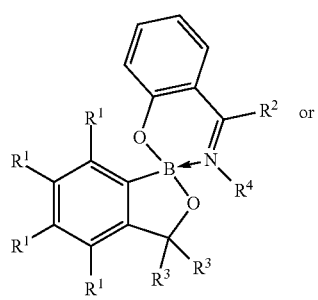

(IIa)

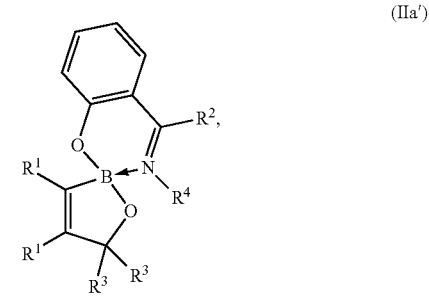

(IIa')

wherein each occurrence of $R^x$ is independently selected from the group consisting of H and optionally substituted $C_{1-6}$ alkyl.

In certain embodiments, each occurrence of $R^3$ is independently selected from the group consisting of H, optionally substituted $C_{1-6}$ alkyl, optionally substituted $C_{1-6}$ alkyl cyano, optionally substituted $C_{1-6}$ nitroalkyl, optionally substituted $C_{1-6}$ aminoalkyl, wherein $R^2$ is selected from the group consisting of H, optionally substituted $C_{1-6}$ alkyl, and optionally substituted $C_3$-$C_8$ cycloalkyl.

In certain embodiments, the compound of formula (IIa) is a compound selected from the group consisting of:

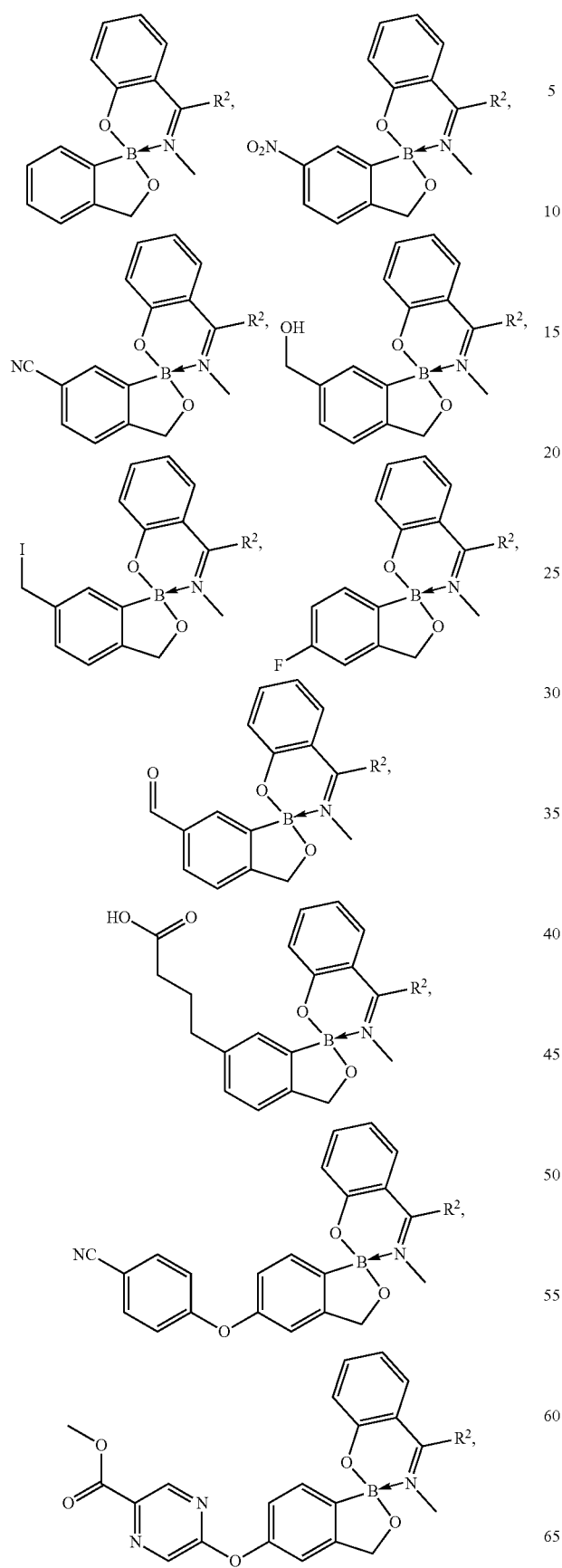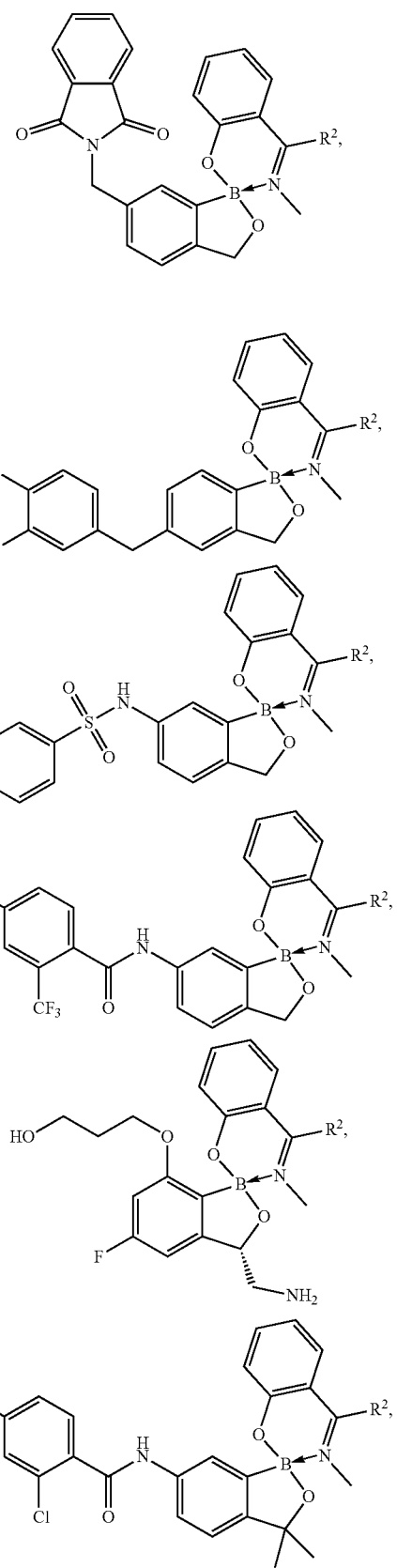

-continued

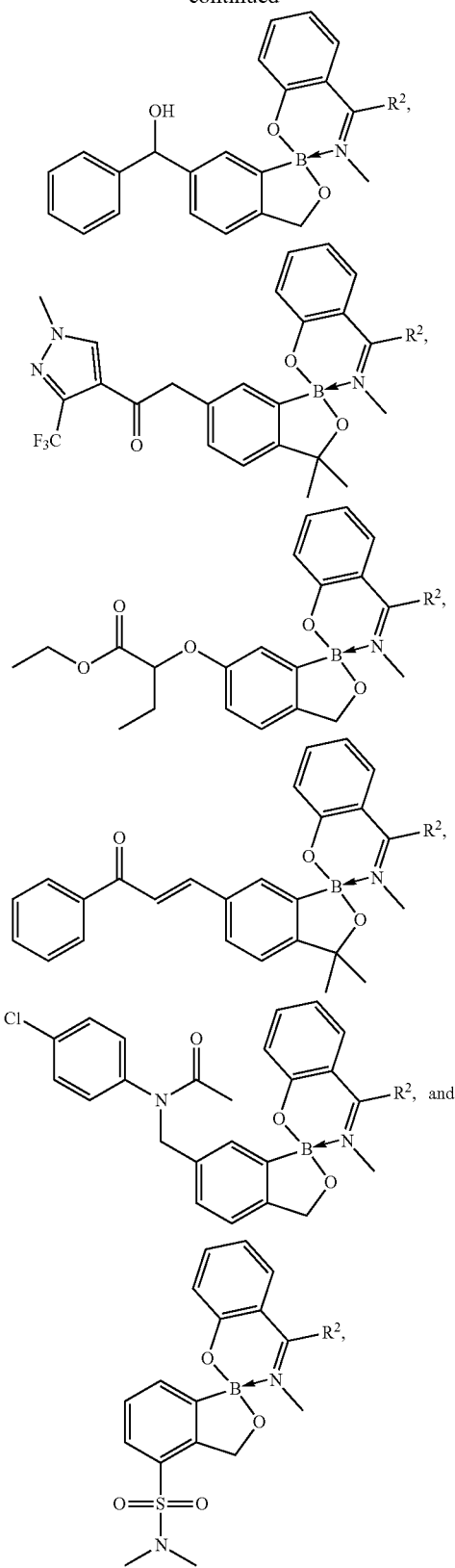

wherein R² is selected from the group consisting of H, optionally substituted $C_{1-6}$ alkyl, and optionally substituted $C_3$-$C_8$ cycloalkyl.

In certain embodiments, the compounds of formula (I)-(I') and formula (II)-(II') are resistant to oxidation. In other embodiments, the compounds of formula (I)-(I') and formula (II)-(II') are stable in aqueous solution. In yet other embodiments, the compounds of formula (I)-(I') and formula (II)-(II') are not degraded through column chromatography wherein the chromatography medium is silica gel.

In certain embodiments, the compounds of formula (I)-(I') and formula (II)-(II') can be contacted with an acidic solution and degrade to form the respective benzoxaborole or oxaborole.

Methods

The invention further provides methods of protecting boronic acid groups. In certain embodiments, the method comprises reacting the boronic acid containing compound with a compound of formula (III) or formula (IV):

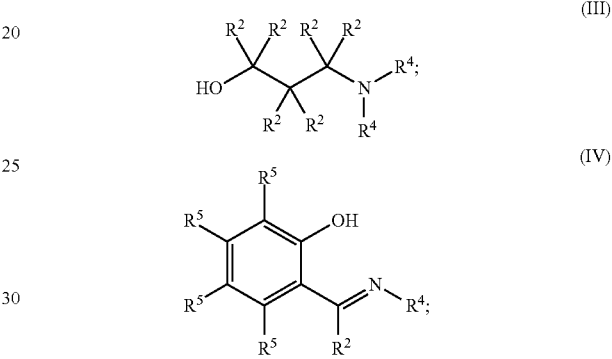

wherein
each occurrence of R² is independently selected from the group consisting of H, optionally substituted $C_{1-6}$ alkyl, halide, optionally substituted $C_{2-6}$ alkenyl, optionally substituted $C_{2-6}$ alkynyl, optionally substituted $C_3$-$C_8$ cycloalkyl, optionally substituted $C_1$-$C_8$ heteroalkyl, optionally substituted $C_3$-$C_8$ heterocycloalkyl, and optionally substituted $C_{1-6}$ perhaloalkyl;

each occurrence of R⁴ is independently selected from the group consisting of H, optionally substituted $C_{1-6}$ alkyl, optionally substituted $C_3$-$C_8$ cycloalkyl, optionally substituted $C_1$-$C_8$ heteroalkyl, and optionally substituted $C_3$-$C_8$ heterocycloalkyl; and each occurrence of R⁵ is independently selected from the group consisting of H, halide, nitro, nitrile and optionally substituted $C_{1-6}$ alkyl.

In certain embodiments, the boronic acid containing compound is a (benz)oxaborole. In other embodiments, the boronic acid containing compound is a (benz)oxaborole of formula:

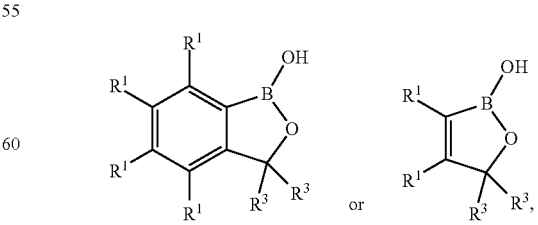

wherein R¹ and R³ are as defined elsewhere herein. In yet other embodiments, the benzoxaborole compound is a compound selected from the group consisting of:

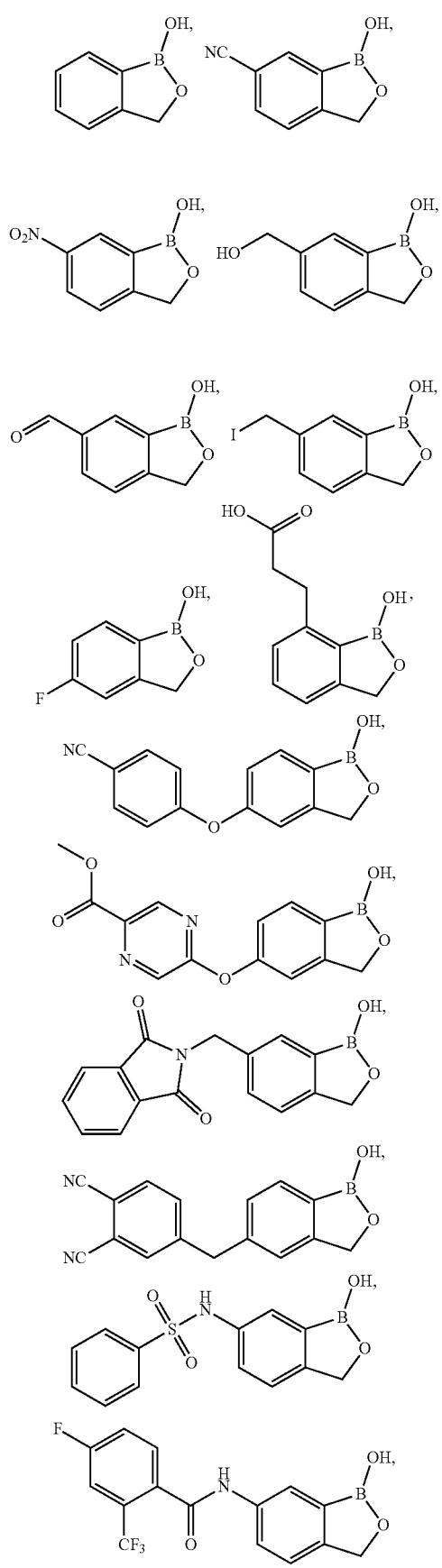
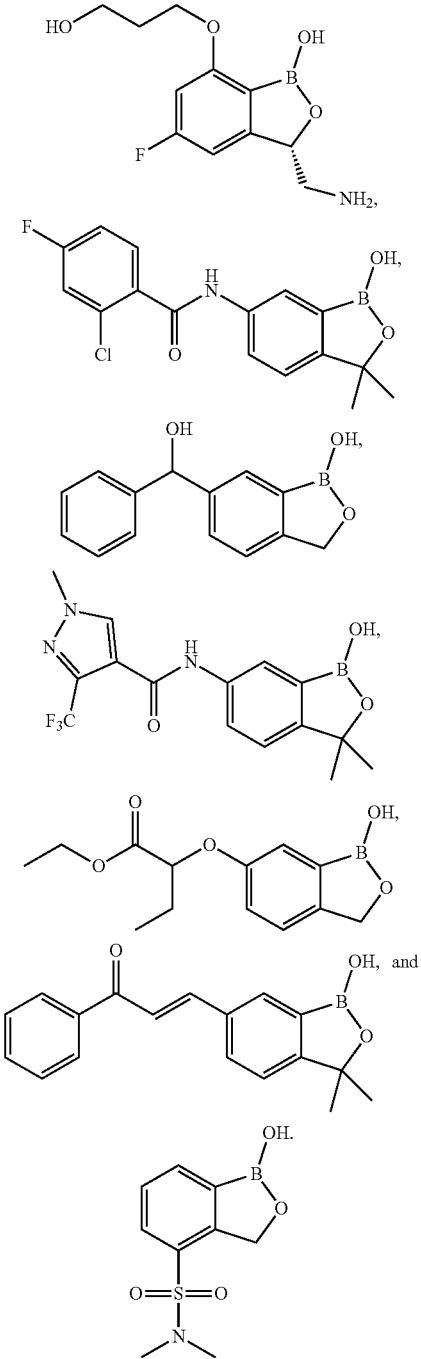
In certain embodiments, the method comprises reacting the boronic acid containing compound with a compound of formula (IIIa) or formula (IVa):
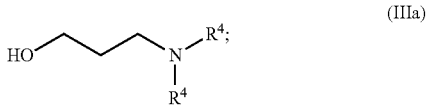
(IIIa)

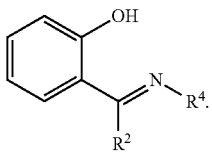

(IVa)

In certain embodiments, the invention provides a method of making a compound of formula (Ia), the method comprising contacting a compound of formula (IIIa) with a (benz)oxaborole of formula:

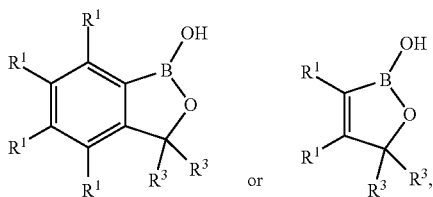

wherein $R^1$ and $R^3$ are as defined elsewhere herein.

In certain embodiments, the invention provides a method of making a compound of formula (IIa), the method comprising contacting a compound of formula (IVa) with a (benz)oxaborole of formula:

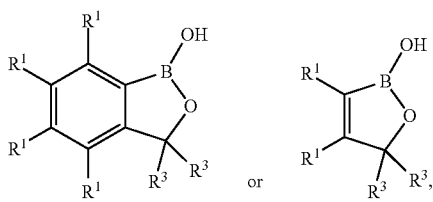

wherein $R^1$ and $R^3$ are as defined elsewhere herein.

In certain embodiments, the invention provides methods of deprotecting boronic acid containing compounds, the method comprising contacting a compound of formula (I), formula (I'), formula (Ia), formula (II), formula (II'), or formula (IIa) with an acidic solution to yield a (benz) oxaborole of formula:

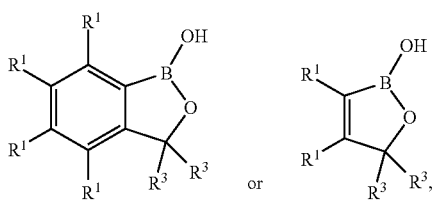

wherein $R^1$ and $R^3$ are as defined elsewhere herein.

The methods and compounds described herein include the use of N-oxides (if appropriate), crystalline forms (also known as polymorphs), solvates, amorphous phases, and/or pharmaceutically acceptable salts of compounds having the structure of any compound of the invention, as well as metabolites and active metabolites of these compounds having the same type of activity. Solvates include water, ether (e.g., tetrahydrofuran, methyl tert-butyl ether) or alcohol (e.g., ethanol) solvates, acetates and the like. In other embodiments, the compounds described herein exist in unsolvated form.

In certain other embodiments, the compounds of the invention exist as tautomers. All tautomers are included within the scope of the compounds recited herein.

Compounds described herein also include isotopically-labeled compounds wherein one or more atoms is replaced by an atom having the same atomic number, but an atomic mass or mass number different from the atomic mass or mass number usually found in nature. Examples of isotopes suitable for inclusion in the compounds described herein include and are not limited to $^2H$, $^3H$, $^{11}C$, $^{13}C$, $^{14}C$, $^{36}Cl$, $^{18}F$, $^{123}I$, $^{125}I$, $^{13}N$, $^{15}N$, $^{15}O$, $^{17}O$, $^{18}O$, $^{32}P$, and $^{35}S$. Isotopically-labeled compounds are prepared by any suitable method or by processes using an appropriate isotopically-labeled reagent in place of the non-labeled reagent otherwise employed.

In certain other embodiments, the compounds described herein are labeled by other means, including, but not limited to, the use of chromophores or fluorescent moieties, bioluminescent labels, or chemiluminescent labels.

The compounds described herein, and other related compounds having different substituents are synthesized using techniques and materials described herein and in the art. General methods for the preparation of compound as described herein are modified by the use of appropriate reagents and conditions, for the introduction of the various moieties found in the formula as provided herein.

Those skilled in the art will recognize, or be able to ascertain using no more than routine experimentation, numerous equivalents to the specific procedures, embodiments, claims, and examples described herein. Such equivalents were considered to be within the scope of this invention and covered by the claims appended hereto. For example, it should be understood, that modifications in reaction conditions, including but not limited to reaction times, reaction size/volume, and experimental reagents, such as solvents, catalysts, pressures, atmospheric conditions, e.g., nitrogen atmosphere, and reducing/oxidizing agents, with art-recognized alternatives and using no more than routine experimentation, are within the scope of the present application.

It is to be understood that, wherever values and ranges are provided herein, the description in range format is merely for convenience and brevity and should not be construed as an inflexible limitation on the scope of the invention. Accordingly, all values and ranges encompassed by these values and ranges are meant to be encompassed within the scope of the present invention. Moreover, all values that fall within these ranges, as well as the upper or lower limits of a range of values, are also contemplated by the present application. The description of a range should be considered to have specifically disclosed all the possible sub-ranges as well as individual numerical values within that range and, when appropriate, partial integers of the numerical values within ranges. For example, description of a range such as from 1 to 6 should be considered to have specifically disclosed sub-ranges such as from 1 to 3, from 1 to 4, from 1 to 5, from 2 to 4, from 2 to 6, from 3 to 6, and so on, as well as individual numbers within that range, for example, 1, 2, 2.7, 3, 4, 5, 5.3, and 6. This applies regardless of the breadth of the range.

The following examples further illustrate aspects of the present invention. However, they are in no way a limitation of the teachings or disclosure of the present invention as set forth herein.

EXAMPLES

The invention is now described with reference to the following Examples. These Examples are provided for the purpose of illustration only, and the invention is not limited to these Examples, but rather encompasses all variations that are evident as a result of the teachings provided herein.

Materials & Methods:

Protection reactions were performed under an ambient atmosphere unless otherwise specified. Moisture and air sensitive reactions were performed under an argon atmosphere in flame- or oven-dried glassware. 3-(N,N-dimethylamino)-1-propanol (1) was purchased from Fisher Scientific and used without further purification. All other commercially available reagents were purchased from Sigma-Aldrich, Acros Organics, Oakwood Chemicals, or Fisher Scientific and used without further purification. Dry tetrahydrofuran (THF) and dichloromethane (DCM) were obtained from a Pure Solv MD-5 Solvent Purification System. Dichloroethane (DCE) was dried over activated 4 Å molecular sieves (Sigma-Aldrich) for 3 days prior to use. All other solvents were obtained from Sigma-Aldrich or Fisher Scientific and used without further purification. Concentration refers to solvent removal on a rotary evaporator. NMR spectra data were obtained on a Bucker Avance 400 MHz NMR spectrometer. Chemical shifts are reported in parts per million (ppm) against tetramethylsilane (TMS) standard or residual solvent signal ($CDCl_3$). $^{11}B$ Spectra are reported in ppm using $BF_3*OEt_2$ as an external standard. $^{13}C$ resonances next to boron are typically not observed due to quadrupolar relaxation. Mass spectra were obtained on a Thermo-Fisher Exactive Orbitrap Mass Spectrometer using Matrix-Assistant Inlet Ionization (MAII) as an ionization source (3-nitrobenzonitrile matrix).[2] Thin layer chromatography was performed on Sorbtech Silica XG Aluminum-backed TLC plates. TLC plates were visualized under a UV lamp (short and long wave). Flash column chromatography was performed with Sorbtech silica (Porosity 60 Å, Particle size 40-63 µm, 230×400 mesh). Columns that were run with triethyl amine (TEA) were neutralized with 2-3 column volumes of stated mobile phase before loading sample. The protected complexes are very hygroscopic. Solids that have absorbed moisture from the air may be dissolved in a minimum volume of acetone, precipitated with hexane, and concentrated to afford a dry solid.

Synthesis of Protecting Groups

Scheme 2

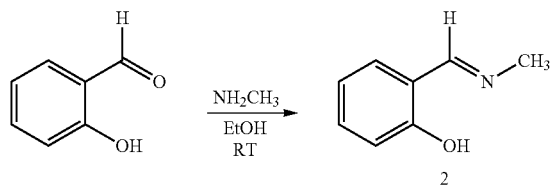

N-methylsalicylidenimine (2). Salicylaldehyde (6 mL, 56 mmol) was dissolved in absolute EtOH (150 mL) in a round-bottom flask. To the mixture was added a solution of $MeNH_2$ (33 wt % in EtOH, 14 mL, 112 mmol) and the reaction immediately became a bright yellow color. The yellow mixture was stirred at room temperature for 8 hours and solvent was removed to afford a yellow oil 2 (7.6 g, Quant.) that was used without further purification. $^1H$ NMR ($CDCl_3$, 400 MHz) δ 3.48 (s, 3H), 6.86 (t, 1H), 6.94 (d, 1H), 7.24 (d, 1H), 7.29 (t, 1H), 8.34 (s, 1H), 13.4 (br s, 1H).

Scheme 3

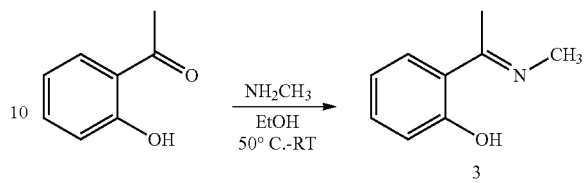

2-[1-(methylimino)ethyl]phenol (3). 2'-hydroxyacetophenone (5 mL, 41.5 mmol) was added to a round-bottom flask and dissolved in absolute EtOH (120 mL). A solution of $MeNH_2$ (33 wt % in EtOH, 16 mL, 128 mmol) was added and the mixture was heated to 50° C. for 5 hrs. The reaction was cooled to room temperature and stirred overnight. The solvent was removed to afford a yellow solid 3 (6.2 g, Quant.), which was used without further purification. $^1H$ NMR ($CDCl_3$, 400 MHz) δ 2.34 (s, 3H), 3.34 (s, 3H), 6.75 (t, 1H), 6.92 (d, 1H), 7.29 (t, 1H), 7.49 (d, 1H).

Synthesis of Benzoxaboroles 3-cyanobenzoxaborole (4b)

Scheme 4

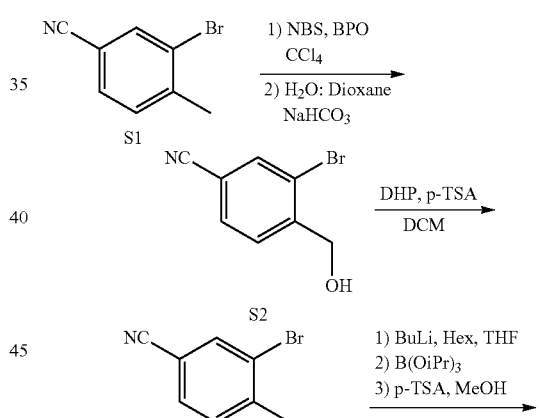

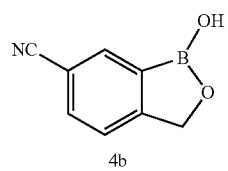

4-methyl-3-bromobenzonitrile (S1). To a round bottom flask equipped with a magnetic stir bar, 16.8 grams (0.143 mole) of p-tolunitrile and 80 mL of aqueous sulfuric acid (1:1, v/v sulfuric acid:water) were added. The flask was wrapped in aluminum foil and the reaction was allowed to run in dark to avoid radical reaction. After the mixture was stirred for 10 minutes, 25.6 grams of N-bromosuccinimide (0.143 mole) was added to the flask slowly over 20 minutes. The mixture was stirred at room temperature for 3 days.

Product was extracted from the reaction mixture by three separate portions of ether. The combined ether solution was washed by brine and dried over anhydrous sodium sulfate. Solvent was removed to afford crude product as a white solid. The product was isolated via silicon gel chromatography (using 40:1 hexane/ethyl acetate solution as eluent). $^1$H NMR (CDCl$_3$): δ 2.44 (s, 3H), 7.30 (d, J=7.8 Hz, 1H), 7.47 (dd, J=8.0, 1.5 Hz, 1H), 7.78 (d, J=1.5 Hz, 1H).

3-bromo-4-hydroxmethylbenzonitrile (S2). An argon flushed round-bottom flask was charged with S1 (9.9 g, 51 mmol), N-bromosuccinimide (13.6 g, 76.5 mmol), benzoyl peroxide (61 mg, 0.25 mmol), and CCl$_4$ (250 mL). The mixture was brought to reflux for 6 hours and then filtered upon completion with CCl$_4$ (2×20 mL). The resulting crude oil was suspended in dioxane:water (1:1, 300 mL) and sodium carbonate (5 g) and brought to reflux overnight. The material was extracted against EtOAc (3×75 mL) and concentrated to a solid 4, which was used in the next reaction without further purification. $^1$H NMR (CDCl$_3$, 400 MHz) δ 4.80 (s, 2H), 7.66 (q, 2H), 7.82 (s, 1H). $^{13}$C NMR (CDCl$_3$, 100 MHz) δ 64.29, 112.66, 117.27, 121.88, 128.40, 131.25, 135.45, 145.18.

3-bromo-4-[[(tetrahydro-2H-pyran-2-yl)oxy]methyl]benzonitrile (S3). To a round-bottom flask containing crude S2 was added dry DCM (120 mL) and stirred. Then, p-toluenesulfonic acid (1.30 g, 6.8 mmol, 13 mol % from S1) was added quickly followed by DHP (6.5 mL, 76.6 mmol, 1.5 eq from S1) at room temperature. The resulting solution was stirred overnight. The reaction was quenched with saturated NaHCO$_3$ (150 mL) and transferred to a separatory funnel. The aqueous layer was extracted with DCM (3×150 mL) and combined organics were washing with water and brine. The organics were concentrated and will be subjected to flash chromatography (SiO$_2$, Gradient 20:1 Hexanes:EtOAc-4:1 Hexanes:EtOAc) to afford S3 (4.94 g, 32.5% from S1) as a clear liquid. $^1$H NMR (CDCl$_3$, 400 MHz) δ 1.5-1.8 (m, 7H), 3.56 (m, 1H), 3.86 (s, 1H), 4.57 (d, 1H, J=15), 4.78 (m, 1H), 4.85 (d, 1H, J=15), 7.61 (d, 1H, J=8), 7.67 (d, 1H, J=8).

3-cyanobenzoxaborole (4b). To a flame-dried round-bottom flask was added S3 (4.94 g, 16.6 mmol) and THF (60 mL). The flask was cooled to −78° C. and BuLi solution (2.5 M in hexanes, 7.3 mL, 18.3 mmol) was added dropwise via syringe over 15 minutes. After the addition, the mixture was stirred at −78° C. for 30 minutes. B(OiPr)$_3$ (4.0 mL, 17.3 mmol) was added via syringe at −78° C. and the reaction was warmed to room temperature to stir for 3 hours. Then, the reaction was cooled to 0° C., quenched with water (20 mL), and diluted with EtOAc and extracted (3×75 mL). The combined organics were dried over Na$_2$SO$_4$ and concentrated to a crude residue. Without purification, the residue was dissolved in MeOH (75 mL) and p-TSA (1.5 g, 8.3 mmol) was added. The mixture was stirred overnight at room temperature and then concentrated to an oil. The residue was quickly dissolved in EtOAc and extracted with 1M hydroxide (2×30 mL). The aqueous layer was acidified with c. HCl and back extracted with EtOAc (3×75 mL), combined organics were dried, and concentrated to produce a yellow solid S3 (873 mg, 33%), which was analytically pure and did not require further purification. $^1$H NMR (DMSO-d$_6$, 400 MHz) δ 5.07 (s, 2H), 7.64 (d, 1H, J=8), 7.92 (d, 2H, J=8), 9.52 (s, 1H). $^{11}$B NMR (DMSO-d$_6$, 128 MHz) δ 32.38.

3-hydroxymethylbenzoxaborole (4c)

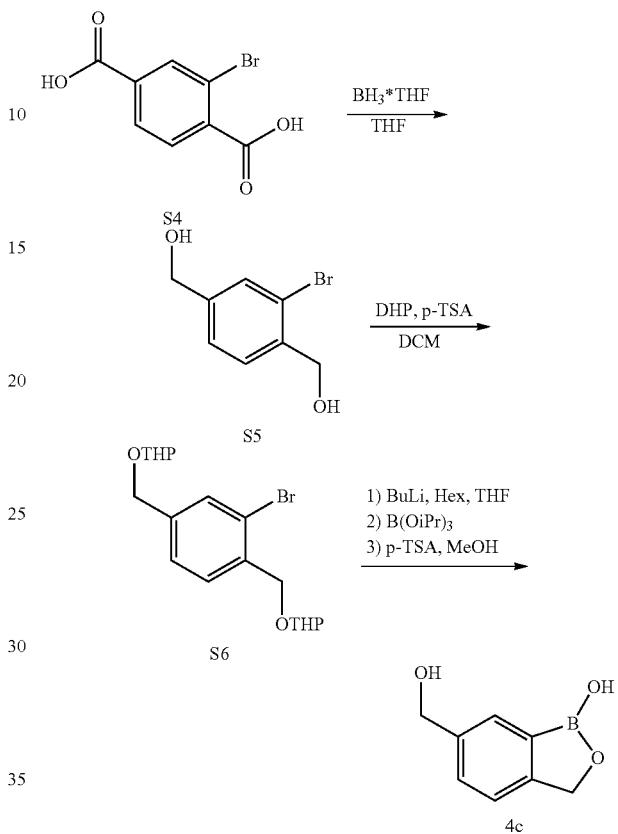

Scheme 5

2-bromo-terephthalic acid (S4). To a 2.5 L round-bottom flask were added 2-bromo-p-xylene (55.5 g, 0.3 mol), 1.2 L water, and KMnO4 (94.8 g, 0.6 mol). The mixture was refluxed slowly until the color faded. Then a second KMnO4 (47.4 g, 0.3 mol) was added. After the color faded, a third KMnO4 (47.4 g, 0.3 mol) was added. The reaction was stopped when the solution was colorless again. The mixture was filtered to remove the insoluble salt. The collected filtrates was acidified to pH 3~4 by HCl when large amount of white solid precipitated from the solution. The crude product was collected by filtration and washed with water, then dried under vacuum to yield 30.6 g of 2-bromoterephthalic acid (yield 41.7%). 1H NMR (400 MHz, DMSO-d6, δ, ppm): 8.15 (d, J=1.4 Hz, ArH ortho to Br, 1H), 7.99 (dd, J=8.0, 1.5 Hz, ArH meta to Br, 1H), 7.84 (d, J=8.0 Hz, ArH para to Br, 1H).

2-bromo-1,4-bis(hydroxymethyl)benzene (S5). A flame-dried round-bottom flask was charged with S4 (5.5 g, 22.4 mmol) and fitted with a pressure-equalizing addition funnel. The solid was dissolved in THF (100 mL) and cooled to 0° C. To the addition funnel was added BH$_3$*THF (1M in THF, 50 mL, 50 mmol) dropwise over 45 minutes. This mixture was stirred at 0° C. for 1 hour, warmed to room temperature, and stirred for 3 hours. The reaction was quenched slowly with the addition of methanol (50 mL) and the mixture was concentrated. The solid residue was dissolved in EtOAc and water (40 mL) and transferred to a separatory funnel. The aqueous layer was extracted with EtOAc (3×75 mL), combined organics were washed with brine, dried over $Na_2SO_4$ and concentrated to afford a white solid S5 (3.89 g, 80%) which needed no further purification. $^1H$ NMR (DMSO-$d_6$, 400 MHz) δ 4.48 (t, 4H), 5.28 (t, 1H), 5.39 (t, 1H), 7.29 (d, 1H, J=7.8), 7.49 (m, 2H) $^{13}C$ NMR (DMSO-$d_6$, 100 MHz) δ 61.8, 62.4, 120.8, 125.5, 127.9, 129.7, 139.1, 143.3.

Alcohol protection with Dihydropyran (S6). To a round-bottom flask containing S5 (3.89 g, 17.9 mmol) was added dry DCM (100 mL) and the solid was suspended by stirring. Then, p-toluenesulfonic acid (390 mg, 2.05 mmol) was added quickly followed by DHP (4.2 mL, 49.5 mmol) at room temperature. The mixture became homogeneous upon vigorous stirring and the resulting solution was stirred overnight. The reaction was quenched with saturated $NaHCO_3$ (30 mL) and transferred to a separatory funnel. The aqueous layer was extracted with DCM (3×75 mL) and combined organics were washing with water and brine. The organics were concentrated and the residue was subject to flash chromatography ($SiO_2$, 9:1 Hexanes:EtOAc) to afford a clear oil 5 (5.22 g, 75%). $^1H$ NMR ($CDCl_3$, 400 MHz) 1.62-1.87 (m, 12H), 3.54 (m, 2H), 3.88 (m, 2H), 4.47 and 4.58 (2× d, 1H each), 4.69-4.82 (overlapping d and t, 4H), 7.28 (d, 2H, J=11.7), 7.46 (d, 2H, J=7.8), 7.56 (s, 1H). $^{13}C$ NMR ($CDCl_3$, 100 MHz) δ 19.2, 19.3, 25.42, 25.44, 30.4, 30.5, 62.14, 62.17, 97.7, 98.3, 126.6, 129.0, 131.6, 136.9, 139.3.

Synthesis of 5-hydroxymethylbenzoxaborole (4c). To a flame-dried round-bottom flask was added S6 (5.2 g, 13.5 mmol) and THF (50 mL). The flask was cooled to −78° C. and BuLi solution (2.5 M in hexanes, 5.6 mL, 14 mmol) was added dropwise via syringe over 30 minutes. After the addition, the mixture was stirred at −78° C. for 30 minutes. $B(OiPr)_3$ (3.2 mL, 15.1 mmol) was added via syringe at −78° C. and the reaction was warmed to room temperature to stir for 3 hours. Then, the reaction was cooled to 0° C., quenched with saturated $NH_4Cl$ (40 mL), and diluted with water/EtOAc. The aqueous layer was extracted with EtOAc (3×50 mL) and combined organics were washed with brine, dried over $Na_2SO_4$, and concentrated. The crude residue was dissolved in MeOH (100 mL) and p-TSA (1.39 g, 7.30 mmol) was added. The mixture was stirred for 5 hours at room temperature and then concentrated to an oil. The residue was quickly dissolved in EtOAc and extracted (3×50 mL) against water (~40 mL). Combined organics were washed with brine and dried over $Na_2SO_4$. Solvent removal produced an off-white solid, which was suspended in hexanes, filtered, and washed with diethyl ether (3×20 mL) to produce a white solid 4c (1.7 g, 77%). The compound was analytically pure and did not require further purification. $^1H$ NMR (MeOD, 400 MHz) δ 4.52 (s, 2H), 4.95 (s, 2H), 7.34 (d, 1H, J=7.8), 7.40 (d, 1H, J=7.8), 7.38 (s, 1H). $^{11}B$ NMR (MeOD, 128 MHz) δ 32.01.

Scheme 6

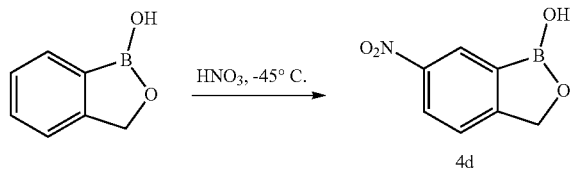

3-nitrobenzoxaborole (4d). 1 g (7.4 mmol, 1 equiv.) of commercially available benzoxaborole was added with stirring to 6.4 mL of fuming nitric acid (18.3 equiv.) cooled at −45/−40° C. The addition was done portion-wise and was complete in about 5 min. The mixture was stirred and maintained at −45 to −30° C., and the progress of the reaction was monitored by TLC (ethyl acetate:petroleum ether=7:3). After 20 min. the mixture was poured into water and ice and kept at 0-10° C. for 2 hours. The obtained white precipitate was then filtered in vacuo, washed with water and lyophilized to afford the compound as a white solid. M.p. 178-180° C.; Rf: 0.32 (ethyl acetate:petroleum ether=7:3); $^1H$ NMR (400 MHz, DMSO-$d_6$): δ 9.59 b(s, 1H, OH), 8.58 (ss, 1H, ArH), 8.33 (d, J=1.7 Hz, 1H, ArH), 8.33 (dd, J1=8.3 Hz, J2=2.2 Hz, 1H, ArH), 7.69 (d, J=8.5 Hz, 1H, ArH), 5.12 (s, 2H, $CH_2$). 13C NMR (101 MHz, DMSO-$d_6$) δ 160.6, 147.2, 140.7, 125.6, 123.1, 70.1 (s, $CH_2$). MS: ESI m z 178.0 $[M]^+$.

Protection of Benzoxaboroles

Scheme 7

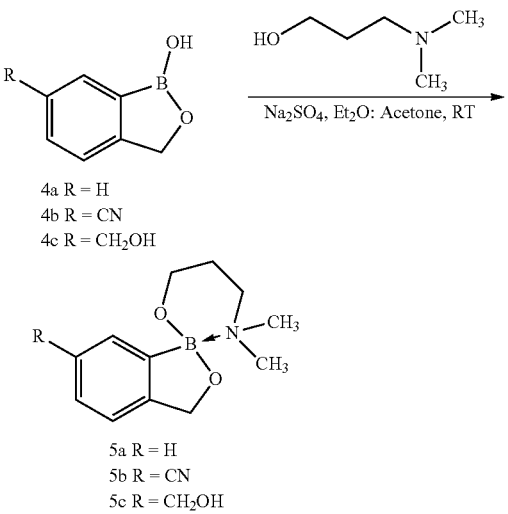

4a R = H
4b R = CN
4c R = $CH_2OH$

5a R = H
5b R = CN
5c R = $CH_2OH$

Protection of benzoxaborole with N,N-dimethylaminopropanol (5a). To an open round-bottom flask was added 4a (200 mg, 1.49 mmol), anhydrous $Na_2SO_4$ (1.68 g, 11.8 mmol), and ether:acetone (1:1 mixture, 6 mL). The mixture was stirred vigorously and 1 (177 μL, 1.50 mmol) was added at RT. Stirring continued for 5.5 hours at RT, diluted with EtOAc (~5 mL), and filtered. The filter cake was washed with EtOAc (3×8 mL) and the filtrate was concentrated to afford 5a (230 mg, 98%) as a hygroscopic white solid. The compound was analytically pure and did not require further purification. $^1H$ NMR ($CDCl_3$, 400 MHz) δ 1.92 (br t, 2-H), 2.44 (s, 6H), 3.15 (br s, 2H), 4.05 (br t, 2H), 5.04 (s, 2H), 7.16 (br m, 3H), 7.52 (br d, 1H). $^{13}C$ NMR ($CDCl_3$, 100 MHz) δ 24.19, 45.42, 58.32, 60.10, 71.91, 120.60, 125.94, 127.45, 129.65, 150.06. $^{11}B$ NMR ($CDCl_3$, 128 MHz) δ 10.35. HRMS (MAII) calc. for $C_{12}H_{18}BNO_2$ $[M+H]^+$ 220.1503, found 220.1514.

Protection of 3-cyanobenzoxaborole with N,N-dimethylaminopropanol (5b). To an open round-bottom flask was added 4b (161 mg, 1.01 mmol), anhydrous $Na_2SO_4$ (1.20 g, 8.47 mmol), and ether:acetone (1:1 mixture, 10 mL). The mixture was stirred vigorously and 1 (120 μL, 1.02 mmol) was added at RT. Stirring continued for 5.5 hours at RT, diluted with EtOAc (~5 mL), and filtered. The filter cake was washed with EtOAc (3×8 mL) and the filtrate was concentrated to afford 5 (223 mg, 90%) as a hygroscopic yellowish solid. The compound was analytically pure and did not require further purification. $^1$H NMR (CDCl$_3$, 400 MHz) δ 1.93 (br s, 2H), 2.16 (br s, 61), 3.15 (br s, 2H), 3.99 (br s, 2H), 5.04 (s, 2H), 7.25 (d, 1H, J=12), 7.52 (d, 1H, J=12), 7.79 (s, 1H). 13C NMR (CDCl$_3$, 100 MHz) δ 23.98, 45.46, 58.44, 60.06, 71.81, 109.83, 120.17, 121.52, 131.46, 133.65, 155.43. $^{11}$B NMR (CDCl$_3$, 128 MHz) δ 9.82. HRMS (MAII) calc. for C$_{13}$H$_{17}$BN$_2$O$_2$ [M+H]$^+$ 245.1456, found 245.1447.

Protection of 3-hydroxymethylbenzoxaborole with N,N-dimethylaminopropanol (5c). To an open round-bottom flask was added 4c (200 mg, 1.22 mmol), anhydrous Na$_2$SO$_4$ (1.3 g, 9.15 mmol), and ether:acetone (1:1 mixture, 10 mL). The mixture was stirred vigorously and 1 (144 μL, 1.22 mmol) was added at RT. Stirring continued for 5.5 hours at RT, diluted with EtOAc (~5 mL), and filtered. The filter cake was washed with EtOAc (3×8 mL) and the filtrate was concentrated to afford 5c (301 mg, 98%) as a hygroscopic white solid. The compound was analytically pure and did not require further purification. $^1$H NMR (CDCl$_3$, 400 MHz) δ 1.88 (br t, 2H), 2.41 (s, 6H), 3.09 (br s, 2H), 3.99 (br t, 2H), 4.66 (br s, 2H), 5.00 (s, 2H), 7.13 (d, 1H, J===7.6), 7.25 (br s, 1H), 7.51 (br s, 1H). 13C NMR (CDCl$_3$, 100 MHz) δ 24.36, 45.44, 58.37, 60.24, 65.75, 71.67, 120.69, 127.08, 128.60, 138.66, 149.83. $^{11}$B NMR (CDCl$_3$, 128 MHz) δ10.28. HRMS (MAII) calc. for C$_{13}$H$_{20}$BNO$_3$ [M+H]$^+$ 250.1609, found 250.1611.

Scheme 8

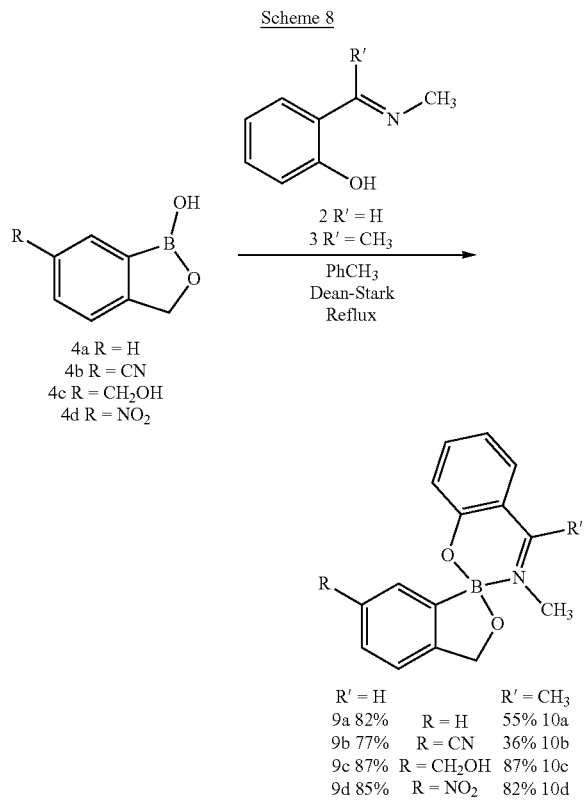

| | R' = H | | R' = CH$_3$ |
|---|---|---|---|
| 9a 82% | R = H | | 55% 10a |
| 9b 77% | R = CN | | 36% 10b |
| 9c 87% | R = CH$_2$OH | | 87% 10c |
| 9d 85% | R = NO$_2$ | | 82% 10d |

Protection of benzoxaborole with Salicimine (9a). A round-bottom flask was charged with a stirbar, 4a (153 mg, 1.14 mmol), and a solution of 2 (196 mg, 1.45 mmol) in toluene (8 mL). The flask was fitted with a Dean-Stark trap and the suspension was brought to reflux for 5 hours. The reaction was then cooled to RT, concentrated, and the resulting residue was subjected to flash chromatography (SiO$_2$, EtOAc w/0.5% TEA) to afford 9a (235 mg, 82% yield) as a white solid. $^1$H NMR (CDCl$_3$, 400 MHz) δ3.18 (s, 3H), 5.04 (d, 1H, J=13.8), 5.20 (d, 1H, J=13.8), 6.88 (t, 1H), 7.02 (d, 1H, J=8.4), 7.21 (m, 2H), 7.30 (m, 2H), 7.37 (d, 1H, J=7), 7.49 (t, 1H), 8.16 (s, $^1$H). $^{13}$C NMR (CDCl$_3$, 100 MHz) δ 42.89, 72.33, 115.56, 118.82, 119.83, 120.63, 126.50, 127.77, 128.52, 130.86, 137.47, 148.97, 160.20, 162.48. $^{11}$B NMR (CDCl$_3$, 128 MHz) δ 8.95. HRMS (MAII) calc. for C$_{15}$H$_{14}$BNO$_2$ [M+H]$^+$ 252.1190, found 252.1181.

Protection of 3-cyanobenzoxaborole with Salicimine (9b). A round-bottom flask was charged with a stirbar, 4b (165 mg, 1.04 mmol), and a solution of 2 (196 mg, 1.45 mmol) in toluene (15 mL). The flask was fitted with a Dean-Stark trap and the mixture was brought to reflux for 5 hours. The reaction was then cooled to RT, concentrated to a minimum amount of toluene (1-2 mL), and precipitated with hexane. After cooling to promote further precipitation, the solid was filtered and washed with cold hexane (3×5 mL) to afford 9b (221 mg, 77% yield) as a yellowish solid. The compound was analytically pure and did not require further purification. $^1$H NMR (CDCl$_3$, 400 MHz) δ 3.18 (s, 3H), 5.06 (d, 1H, J=15.2), 5.22 (d, 1H, J=15.2), 6.93 (t, 1H), 7.01 (d, 1H, J=8.4), 7.31 (d, 1H, J=7.8), 7.35 (d, 1H, J=7.6), 7.56 (t, 1H), 8.22 (s 1H). $^{13}$C NMR (CDCl$_3$, 100 MHz) δ 42.75, 72.15, 110.33, 115.34, 119.39, 119.68, 120.09, 121.54, 131.09, 131.67, 132.85, 138.07, 154.13, 159.76, 163.19. $^{11}$B NMR (CDCl$_3$, 128 MHz) δ 8.47. HRMS (MAII) calc. for C$_{16}$H$_{13}$BN$_2$O$_2$ [M+H]$^+$ 277.1143, found 277.1135.

Protection of 3-hydroxymethylbenzoxaborole with Salicimine (9c). A round-bottom flask was charged with a stirbar, 4c (415 mg, 2.53 mmol), and a solution of 2 (400 mg, 2.96 mmol) in toluene (10 mL). The flask was fitted with a Dean-Stark trap and the suspension was brought to reflux for 5 hours. The reaction was then cooled to room temperature and hexane (30 mL) was added. The resulting precipitate was filtered, washed with cold hexanes (3×~10 mL), and dried in vacuo to afford 9c (711 mg, 87% yield) as a white, fluffy solid. The compound was analytically pure and did not require further purification. $^1$H NMR (CDCl$_3$, 400 MHz) δ 3.17 (s, 3H), 4.64 (s, 2H), 5.03 (d, 1H, J=13.8), 5.18 (d, 1H, J=13.9), 7.00 (d, 1H, J=8.4), 7.20 (d, 1H, 7.6), 7.29 (t, 2H), 7.36 (s, 1H) 7.49 (t, 1H), 8.15 (s, 1H). 3C NMR (CDCl$_3$, 100 MHz) 42.83, 65.84, 72.13, 115.48, 118.90, 119.74, 120.79, 127.17, 12729, 130.93, 137.56, 139.10, 148.63, 160.07, 162.58. $^{11}$B NMR (CDCl$_3$, 128 MHz) δ 8.86. HRMS (MAII) calc. for C$_{16}$H$_{16}$BNO$_3$ [M+H]$^+$ 282.1296, found 282.1288.

Protection of 3-nitrobenzoxaborole with Salicimine (9d). A round-bottom flask was charged with a stirbar, 4d (207 mg, 1.18 mmol), and a solution of 2 (233 mg, 1.73 mmol) in toluene (15 mL). The flask was fitted with a Dean-Stark trap and the solution was brought to reflux overnight. The reaction was then cooled to room temperature, concentrated to an oil, and precipitated with hexanes. The mixture was concentrated again and the solid was subject to column chromatography (SiO$_2$, 4:1 EtOAc:Hexanes with 1% triethylamine) to afford 9d (298 mg, 85% yield) as a yellowish solid. $^1$H NMR (CDCl$_3$, 400 MHz) δ 3.19 (s, 3H), 5.09 (d, 1H, J=15.5), 5.24 (d, 1H, J=15.5), 6.93 (t, 1H), 7.00 (d, 1H, J=8.4), 7.35 (t, 2H), 7.54 (t, 1H), 8.15 (d, 1H, J=8.2), 8.19 (s, 1H), 8.23 (s, 1H). 13C NMR (CDCl$_3$, 100 MHz) δ 42.70, 71.92, 119.42, 119.64, 121.45, 123.57, 123.87, 131.15, 138.16, 147.65, 156.21, 159.74, 163.35. $^{11}$B NMR (CDCl$_3$, 128 MHz) δ 8.48. H-RMS (MAII) calc. for C$_{15}$H$_{13}$BN$_2$O$_4$ [M+H]$^+$ 297.1041, found 297.1058.

Protection of Benzoxaborole with 2-[1-(methylimino)ethyl]phenol (10a). A round-bottom flask was charged with a stirbar, 4a (910 mg, 6.81 mmol), 3 (1.22 g, 8.17 mmol) and toluene (10 mL). The flask was fitted with a Dean-Stark trap and the suspension was brought to reflux for 5 hours. The reaction was then cooled to room temperature, concentrated to a minimum amount of toluene (1-2 mL), and hexane (30 mL) was added. The resulting precipitate was filtered, washed with cold hexanes (3×~10 mL), and dried in vacuo to afford 10a (1.0 g, 55% yield) as an off-white solid. The compound was analytically pure and did not require further purification. $^1$H NMR (CDCl$_3$, 400 MHz) δ 2.57 (s, 3H), 3.09 (s, 3H), 5.04 (d, 1H, J=13.8), 5.20 (d, 1H, J=13.8), 6.88 (t, 1H), 7.03 (d, 1H, J=8.3), 7.19 (m, 2H), 7.30 (m, 2H), 7.45 (t, 1H), 7.58 (d, 1H, J=8). $^{13}$C NMR (CDCl$_3$, 100 MHz) δ 16.30, 37.05, 72.05, 117.38, 118.59, 120.67, 126.41, 127.60, 127.93, 128.39, 136.28, 148.89, 159.38, 170.08. $^{11}$B NMR (CDCl$_3$, 128 MHz) δ 8.74. HRMS (MAII) calc. for C$_{16}$H$_{16}$BNO$_2$ [M+H]$^+$ 266.1347, found 266.1371.

Protection of 3-cyanobenzoxaborole with 2-[1-(methylimino)ethyl]phenol (10b). A round-bottom flask was charged with a stirbar, 4b (150 mg, 0.940 mmol), 3 (196 mg, 1.32 mmol), and toluene (10 mL). The flask was fitted with a Dean-Stark trap and the suspension was brought to reflux for 5 hours. The reaction was then cooled to room temperature, concentrated to a minimum amount of toluene (1-2 mL), and hexane (30 mL) was added. The resulting precipitate was filtered, washed with cold hexanes (3×~10 mL), and dried in vacuo to afford 10b (100 mg, 36% yield) as a yellowish solid. The compound was analytically pure and did not require further purification. $^1$H NMR (CDCl$_3$, 400 MHz) δ 2.60 (s, 3H), 3.07 (s, 3H), 5.07 (d, 1H, J=25.2), 5.21 (d, 1H, J=15.1), 6.93 (t, 2H), 7.01 (d, 1H, J=8.3), 7.29 (d, 1H, J=7.8), 7.49 (t, 2H), 7.54 (d, 1H, J=7.8), 7.58 (s, 2H), 7.60 (d, 1H, J=8.1). $^{13}$C NMR (CDCl$_3$, 100 MHz) S: 16.48, 36.95, 71.89, 110.20, 117.15, 129.18, 120.18, 120.51, 121.55, 128.14, 132.48, 132.75, 136.84, 154.07, 158.87, 171.09. $^{11}$B NMR (CDCl$_3$, 128 MHz) δ 8.35. HRMS (MAII) calc. for C$_{17}$H$_{15}$BN$_2$O$_2$[M+H]$^+$ 291.1299, found 291.1325.

Protection of 3-hydroxymethylbenzoxaborole with 2-[1-(methylimino)ethyl]phenol (10c). A round-bottom flask was charged with a stirbar, 4c (403 mg, 2.45 mmol), 3 (435 mg, 2.91 mmol), and toluene (10 mL). The flask was fitted with a Dean-Stark trap and the suspension was brought to reflux for 5 hours. The reaction was then cooled to room temperature and hexane (30 mL) was added. The resulting precipitate was filtered, washed with cold hexanes (3×~10 mL), and dried in vacuo to afford 10c (723 mg, 87% yield) as a white, fluffy solid. The compound was analytically pure and did not require further purification. $^1$H NMR (CDCl$_3$, 400 MHz) δ 2.57 (s, 3H), 3.08 (s, 3H), 4.63 (s, 2H), 5.03 (d, 1H, J=13.9), 5.18 (d, 1H, J=13.9), 6.88 (t, 1H), 7.02 (d, 1H, J=8.3), 7.21 (d, 1H, J=7.6), 7.31 (d, 2H), 7.46 (t, 1H), 7.58 (d, 1H, J=8.1). 13C NMR (CDCl$_3$, 100 MHz) δ 16.32, 37.08, 65.94, 71.87, 117.21, 118.68, 120.61, 120.85, 127.05, 127.24, 127.99, 136.38, 138.95, 148.65, 159.23, 170.20. $^{11}$B NMR (CDCl$_3$, 128 MHz) δ 8.72. HRMS (MAII) calc. for C$_{17}$H$_{18}$BNO$_3$ [M+H]$^+$ 296.1453, found 296.1446.

Protection of 3-nitrobenzoxaborole with 2-[1-(methylimino)ethyl]phenol (10d). A round-bottom flask was charged with a stirbar, 4d (184 mg, 1.23 mmol), 3 (203 mg, 1.12 mmol), and toluene (25 mL). The flask was fitted with a Dean-Stark trap and the mixture was brought to reflux for 5 hours. The reaction was then cooled to room temperature, concentrated to a minimum amount of toluene (1-2 mL), and hexane (30 mL) was added. The resulting precipitate was filtered, washed with cold hexanes (3×~10 mL), and dried in vacuo to afford 10d (288 mg, 83% yield) as a yellow solid. The compound was analytically pure and did not require further purification. $^1$H NMR (CDCl$_3$, 400 MHz) δ 2.62 (s, 3H), 3.09 (s, 3H), 5.10 (d, 1H, J=15.5), 5.24 (d, 1H, J=15.5), 6.93 (t, 1H), 7.01 (d, 1H, J=8.4), 7.33 (d, 1H, J=8.2), 7.49 (t, 1H), 7.62 (d, 1H, J=8), 8.14 (2s, 2H). $^{13}$C NMR (CDCl$_3$, 100 MHz) δ 16.45, 36.95, 71.65, 119.17, 120.47, 121.40, 123.39, 123.77, 128.16, 136.92, 156.14, 158.79. $^{11}$B NMR (CDCl$_3$, 128 MHz) δ 8.25. HRMS (MAI) calc. for C$_{16}$H$_{15}$BN$_2$O$_4$ [M+H]$^+$ 311.1198, found 311.1190.

Functionalization of Benzoxaboroles

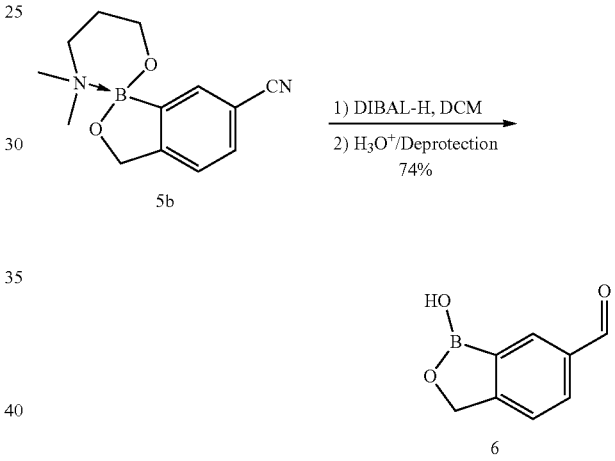

Scheme 9

DIBAL-H reduction of nitrile (6). To a round-bottom flask containing 5b (212 mg, 0.865 mmol) was added DCM (7 mL) and the solution was cooled to −78° C. DIBAL-H (1M in Hexane, 1.3 mL, 1.3 mmol) was added dropwise via syringe over 15 minutes. After addition, the reaction was stirred for 30 minutes at −78° C. and then warmed to RT over 8 hours. The reaction was quenched with EtOAc (12 mL) and 1M HCl (8 mL), which also promoted deprotection. The mixture was transferred to a separatory funnel with additional EtOAc (~15 mL) and water (5 mL). The mixture was extracted and the aqueous layer was treated with additional EtOAc (2×15 mL), combined organics were washed with brine, and dried over Na$_2$SO$_4$. Concentration afforded an off-white solid 6 (111 mg, 79%) which was analytically pure and did not require further purification. $^1$H NMR (DMSO-d$_6$, 400 MHz) δ 5.08 (s, 2H), 7.63 (d, 1H, J=7.8), 8.00 (d, 1H, J=7.8), 8.27 (s, 1H), 9.45 (s, 1H, B—OH), 10.06 (s, 1H). $^{13}$C NMR (DMSO-d$_6$, 100 MHz) S 70.58, 122.80, 132.01, 132.81, 135.86, 160.77, 193.63. $^{11}$B NMR (DMSO-d$_6$, 128 MHz) δ 31.65. HRMS (MAII) calc. for C$_8$H$_7$BO$_3$ [M+H]$^+$ 163.0561, found 163.0568.

Scheme 10

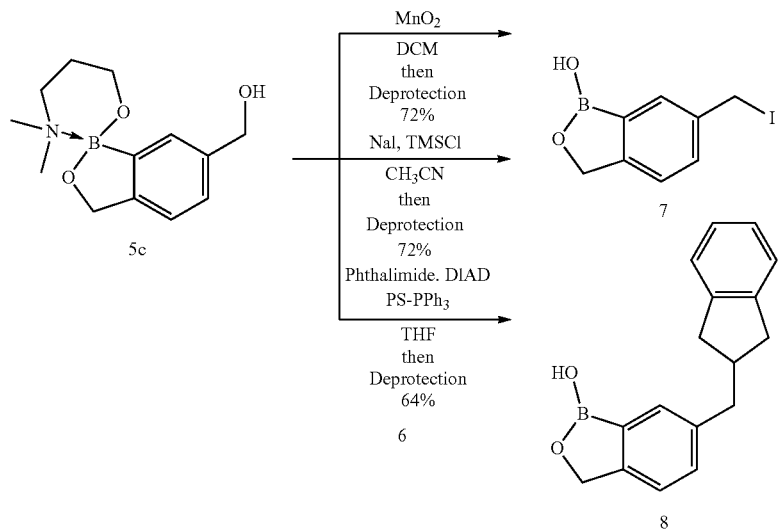

Oxidation of alcohol with MnO₂ (6). In a round-bottom flask, 5c (211 mg, 0.850 mmol) was dissolved in dry DCM (6 mL) and MnO₂ (1.2 g, 13.8 mmol) was added at RT. The mixture was stirred for 32 hours at RT, filtered over celite, and the filter cake was washed with EtOAc (3×15 mL). The filtrate was transferred to a separatory funnel and washed with 1M HCl (~20 mL) to promote deprotection. The organic layer was dried over Na₂SO₄ and concentrated to an off-white solid 6 (99 mg, 72%) which did not require further purification. Characterization data matches the above reaction.

Synthesis of 3-iodomethylbenzoxaborole (7). To a dry round-bottom flask with a stir bar was added 5c (245 mg, 0.983 mmol) and NaI (460 mg, 3.06 mmol). Chlorotrimethylsilane (375 μL, 2.95 mmol) was added dropwise over 5 min at 0° C., allowed to stir at 0° C. for 5 more min, and warmed to rt for 3 hr. The mixture was concentrated, dissolved in ether (25 mL) and 1M HCl (~10 mL), and transferred to a separatory funnel. The aqueous layer was extracted once more with ether (25 mL) and combined organics were washed once with sat'd NaHSO₃ and once with sat'd brine. The organic layer was dried over Na₂SO₄, filtered, concentrated, and dried in vacuo to afford a dry, white solid 7 (181 mg, 72%) which did not require further purification. $^1$H NMR (CDCl₃, 400 MHz) δ 4.52 (s, 2H), 5.06 (s, 2H), 7.29 (d, 1H, J=7.9), 7.51 (d, 1H, J=7.8), 7.75 (s, 11). 13C NMR (CDCl₃, 100 MHz) δ 5.47, 71.21, 121.66, 130.50, 131.77, 138.51, 153.53. $^{11}$B NMR (CDCl₃, 128 MHz) δ 32.24. HRMS (MAII) calc. for C₈H₈BO₂ [M-I]⁺ 147.0612, found 147.0623.

Mitsunobu reaction (8). To a round-bottom flask containing 5c (165 mg, 0.662 mmol) was added PS—PPh₃ (2.32 mmol/g loading, 730 mg, 1.69 mmol) and phthalimide (150 mg, 1.02 mmol). THF (6 mL) was added, cooled to 0° C., and DIAD (195 μL, 1.02 mmol) was added dropwise over 15 min. The reaction was stirred for an additional 15 min at 0° C. and warmed to rt for 24 h. The mixture was filtered, resin washed with EtOAc (3×10 mL), and the filtrate was washed with 1M HCl (5 mL) in a separatory funnel to promote deprotection. The organic phase was absorbed onto silica and subjected to flash chromatography (SiO₂, 20:1 DCM:Acetone→1:1 DCM:Acetone) to afford 8 (124 mg, 64%) as a white solid. $^1$H NMR (CDCl₃, 400 MHz) δ 4.91 (s, 2H), 5.06 (s, 2H), 7.30 (d, 1H, J=7.8), 7.46 (t, 1H), 7.57 (d, 1H, J=7.8), 7.70 (m, 2H), 7.80 (s, 1H), 7.84 (2H). $^{13}$C NMR (CDCl₃, 100 MHz) δ 41.50, 71.06, 121.42, 123.39, 128.44, 130.47, 131.59, 132.07, 134.03, 135.39, 153.55, 168.06. $^{11}$B NMR (CDCl₃, 128 MHz) δ 32.76. HRMS (CI) calc. for C₁₆H₁₂BNO₄ [M−1]⁻ 292.0895, found 292.0881.

Scheme 11

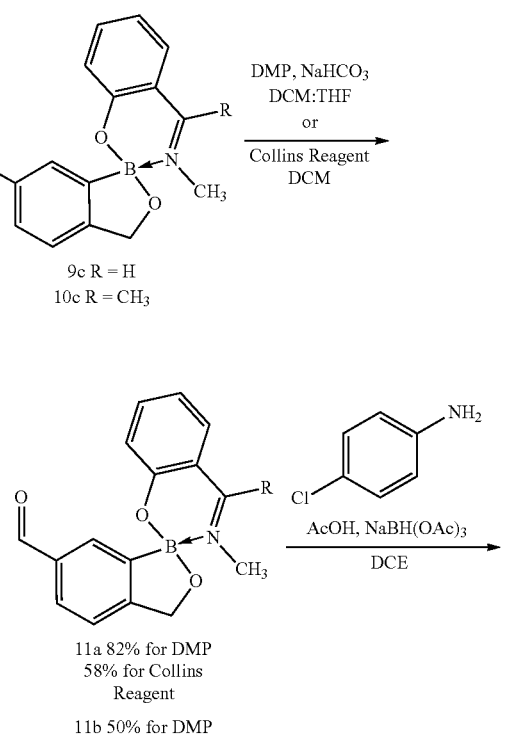

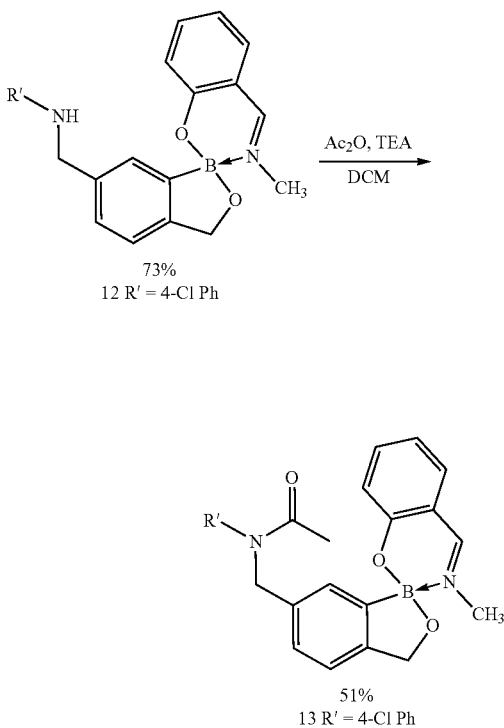

Dess-Martin Oxidation of Salicylimine-protected aldehyde (11a). A round-bottom flask containing a stirbar was charged with Dess-Martin periodinane (550 mg, 1.29 mmol), anhydrous NaHCO$_3$ (259 mg, 3.08 mmol), and 9c (305 mg, 1.08 mmol). Dry DCM (10 mL) and dry THF (4 mL) were added to the round-bottom flask at room temperature and the mixture was stirred at room temperature for 4 hours. The reaction was quenched with saturated Na$_2$S$_2$O$_4$ (6 mL), stirred for 5 minutes, and transferred to a separatory funnel. The layers were separated and the aqueous layer was extracted with DCM (2×15 mL). Combined organics were washed with brine, dried over Na$_2$SO$_4$, and concentrated. The residue was subject to column chromatography (SiO$_2$, EtOAc with 1.5% triethylamine) to afford 11a (247 mg, 82%) as a hydroscopic yellow solid. $^1$H NMR (CDCl$_3$, 400 MHz) δ 3.19 (s, 3H), 5.09 (d, 1H, J=15.3), 5.25 (d, 1H, J=15.3), 6.92 (t, 1H), 7.01 (d, 1H, J=8.4), 7.36 (t, 1H), 7.52 (t, 1H), 7.81 (d, 1H, J=7.7), 7.89 (s, 1H), 8.21 (d, 1H), 9.98 (s, 1H). $^{13}$C NMR (CDCl$_3$, 100 MHz) δ 42.75, 72.16, 115.36, 119.21, 119.69, 121.35, 130.10, 130.49, 131.05, 135.56, 137.93, 156.33, 159.90, 163.05 $^{11}$B NMR (CDCl$_3$, 128 MHz) δ 8.66. HRMS (MAII) calc. for C$_{16}$H$_{14}$BNO$_3$ [M+H]$^+$ 280.1140, found 280.1133.

Collins Reagent Oxidation of Salicylimine-protected alcohol (11a). To a dry round-bottom flask containing a stir bar and dry DCM (5 mL) was added pyridine (340 μL, 4.20 mmol). The flask was flushed with argon, cooled to 0° C., and CrO$_3$ (219 mg, 2.19 mmol) was added in one portion. The mixture was allowed to stir for 45 min at 0° C. after which 9c (100 mg, 0.37 mmol) was added in one portion. The mixture was stirred at 0° C. for 1 hr, filtered over silica, and washed acetone (5×5 mL). The filtrate was concentrated and the resulting brown solid was subjected to column chromatography (SiO$_2$, EtOAc with 1.5% triethylamine) to afford 11a (60 mg, 58%) as a hydroscopic yellow solid. Characterization exactly matches the previous procedure for 11a.

Dess-Martin Oxidation of protected alcohol (11b). Synthesized by the same procedure as 11a from 10c (300 mg, 1.01 mmol), Dess-Martin periodinane (519 mg, 1.21 mmol), anhydrous NaHCO$_3$ (254 mg, 3.03 mmol) in dry DCM (10 mL) and dry THF (4 mL) to produce 11b (148 mg, 50%), which was purified by column chromatography (SiO$_2$, EtOAc with 1.5% triethylamine). $^1$H NMR (CDCl$_3$, 400 MHz) δ 2.59 (s, 3H), 3.07 (s, 3H), 5.09 (d, 1H, J=15.3), 5.25 (d, 1H, J=15.3), 6.89 (t, 1H), 7.01 (d, 1H, J=8.3), 7.36 (d, J=7.8, 1H), 7.46 (t, 1H), 7.60 (d, J=8.1, 1H), 7.79 (s, J=7.7, 1H), 7.83 (s, 1H), 9.96 (s, 1H). $^{13}$C NMR (CDCl$_3$, 100 MHz) δ 16.39, 36.97, 71.90, 117.08, 118.96, 120.52, 121.36, 128.10, 129.99, 130.31, 135.51, 136.69, 156.33, 159.01, 170.82, 193.09. $^{11}$B NMR (CDCl$_3$, 128 MHz) δ 8.55. HRMS (MAII) calc. for C$_{17}$H$_{16}$BNO$_3$ [M+H]$^+$ 294.1296, found 294.1274.

Reductive amination (12). In a round-bottom flask, 11a (103 mg, 0.369 mmol) was dissolved in dry dichloroethane (4 mL). 4-chloroaniline (50 mg, 0.392 mmol) and AcOH (20 μL, 0.349 mmol) were added and the mixture was stirred at room temperature for 8 hours. After this time, sodium triacetoxyborohydride (130 mg, 0.613 mmol) was added and stirred at room temperature for 16 hrs. The mixture was concentrated to a residue that was absorbed onto silica and subjected to flash chromatography (SiO$_2$, 20:1 DCM:Acetone with 1% triethylamine) to afford 12 (105 mg, 73%) as a yellow solid. $^1$H NMR (CDCl$_3$, 400 MHz) δ 3.17 (s, 3H), 4.24 (s, 2H), 5.03 (d, 1H, J=13.8), 5.20 (d, 1H, J=13.8), 6.55 (d, 2H, J=8.6), 6.89 (t, 1H), 7.02 (d, 1H, J=8.4), 7.08 (d, 2H, J=8.6), 7.20 (d, 1H, J=7.6), 7.30 (t, 2H), 7.35 (s, 1H), 7.50 (t, 1H), 8.17 (s, 1H). $^{13}$C NMR (CDCl$_3$, 100 MHz) δ 42.92, 48.74, 72.14, 113.85, 115.44, 118.95, 119.78, 120.92, 121.78, 127.57, 127.83, 128.96, 130.92, 136.79, 137.58, 146.89, 148.49, 160.06, 162.59. $^{11}$B NMR (CDCl$_3$, 128 MHz) δ 8.83. HRMS (MAII) calc. for C$_{22}$H$_{20}$BClN$_2$O$_2$ [M+H]$^+$ 391.1379, found 391.1385, calc. for C$_{16}$H$_{16}$BNO$_2$ [M-N(4-ClPh)]$^+$ 264.1190, found 264.1193.

Acetylation of amine (13). To a dry round-bottom flask was added 12 (47 mg, 0.120 mmol) and DCM (3 mL). Triethylamine (35 μL, 0.251 mmol) and acetic anhydride (40 μL, 0.420 mmol) were added via microsyringe under argon and stirred at RT for 5 hours. After this time, the mixture was concentrated and the crude residue was subjected to flash chromatography (EtOAc w/2% TEA→3:1 EtOAc:Acetone) to afford 13 (26 mg, 51%) as a white solid. $^1$H NMR (CDCl$_3$, 400 MHz) δ 1.84 (s, 3H), 3.09 (s, 31), 6.63 (d, 1H, J=14), 4.99 (d, 1H, J=13.9), 5.05 (d, 1H, J=14.1), 5.14 (d, 1H, J=13.9), 6.87 (m, 3H), 6.99 (d, 1H, J=8.4), 7.09 (m, 3H), 7.24 (d, 2H, J=8.5), 7.29 (d, 1H, J=7), 7.48 (t, 1H) 8.14 (s, 1H). 13C NMR (CDCl$_3$, 100 MHz) δ 22.82, 42.76, 52.73, 72.11, 115.50, 118.90, 119.70, 120.70, 128.65, 129.28, 129.56, 129.84, 130.91, 133.56, 134.96, 137.53, 141.30. $^{11}$B NMR (CDCl$_3$, 128 MHz) δ 8.81. HRMS (MAII) calc. for C$_{24}$H$_{22}$BN$_2$O$_3$ [M+H]$^+$ 433.1485, found 433.1493.

Scheme 12

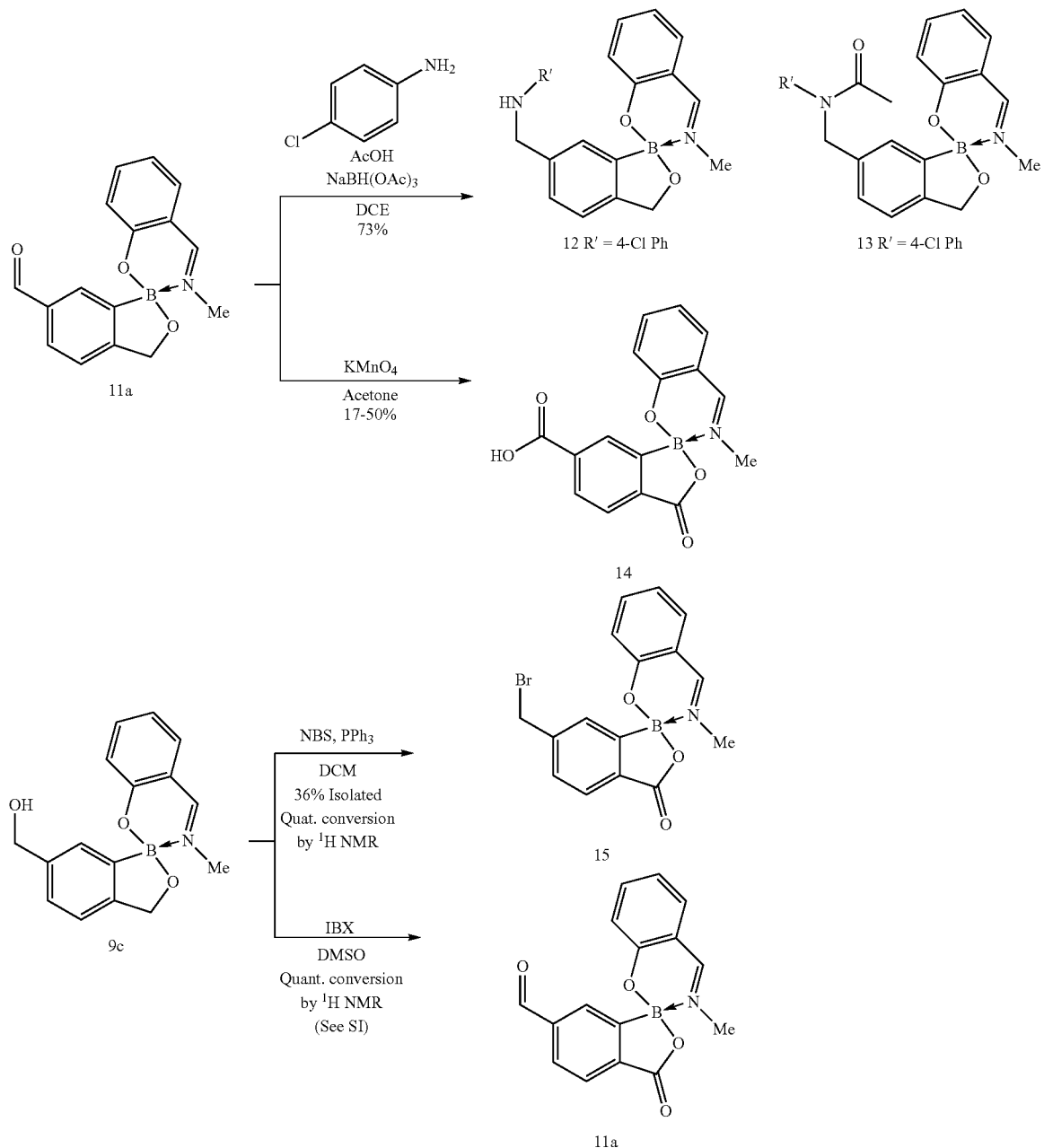

Oxidation of aldehyde with KMnO₄ (14). To a round-bottom flask containing a solution of 11a (108 mg, 0.386 mmol) in acetone (4 mL) was added solid KMnO₄ (198 mg, 1.25 mmol) in one portion at rt. The mixture was stirred for 3 h and then filtered over a pad of celite. The filter cake was washed with acetone (2×10 mL) and the purple filtrate was concentrated. To the residue was added EtOAc (15 mL) and sat'd NaHSO₃ (5 mL, corrected to ~pH 3 with HCl). The mixture was transferred to a separatory funnel, extracted, and the aqueous phase was extracted with another portion of EtOAc (10 mL). The combined organics were dried over Na₂SO₄ and concentrated to afford 14 (21 mg, 17%). Workup can also be modified by diluting the crude reaction mixture with EtOAc (~15 mL) and extracting against sat'd NaHSO₃ (~10n mL) and 1M HCl (~15 mL). The aqueous phase was extracted again with EtOAc (~15 mL), combined organics dried, and concentrated. The resulting residue was resuspended in EtOAc:Acetone (1:1), decanted, and concentrated to afford 14 in 50% yield. White solid. ¹H NMR (DMSO-d₆, 400 MHz) δ 3.09 (s, 3H), 7.02 (d, 2H, J=15.3), 7.68 (d, 1H, J=15.3), 7.80 (s, 1H), 8.07 (d, 2H), 9.07 (s, 1H), 13.01 (br s, 1H). 13C NMR (DMSO-d₆, 100 MHz) δ42.35, 115.50, 116.24, 118.77, 119.35, 120.80, 125.43, 133.04, 133.66, 133.68, 138.69, 140.20, 158.30, 168.30, 170.50. ¹¹B NMR (DMSO-d₆, 128 MHz) δ 5.38. FIRMS (MAII) calc. for C₁₆H₁₂BNO₅ [M+H]⁺ 294.0932, found 294.0912.

Bromination via Appel Reaction (15). To a dry round-bottom flask was added 9c (111 mg, 0.394 mmol), PPh₃ (141 mg, 0.537 mmol), and N-bromosuccinimide (107 mg, 0.601 mmol). DCM (5 mL) was added to dissolved at 0° C. and stirred for 1 h. The mixture was warmed to rt for 2 h and then concentrated to a solid residue. $^1$H NMR showed complete conversion to the benzylic bromide. The residue was subjected to flash chromatography (SiO$_2$, DCM:ACN 9:1) to afford pure 15 (49 mg, 36%). Hygroscopic white solid. $^1$H NMR (CDCl$_3$, 400 MHz) δ 3.18 (s, 31H), 4.51 (s, 2H), 5.03 (d, 1H, J=142), 5.17 (d, 11H, J=14.2), 6.89 (t, 1H), 7.01 (d, 1H, J=8.4), 7.20 (d, 1H, J=7.8), 7.33 (d, 2H, J=7.7), 7.38 (s, 1H), 7.50 (t, 1H), 8.19 (s, 1H). $^{13}$C NMR (CDCl$_3$, 100 MHz) δ 34.83, 42.93, 72.09, 115.45, 119.01, 119.76, 121.08, 129.01, 129.30, 130.96, 135.95, 137.65, 149.49, 159.99, 162.74. $^{11}$B NMR (CDCl$_3$, 128 MHz) δ 8.75. HRMS (MAII) calc. for C$_{16}$H$_{15}$BNO$_2$ [M−Br+H]$^+$ 264.1190, found 264.1179.

Deprotection of Complexes with 2

Scheme 13

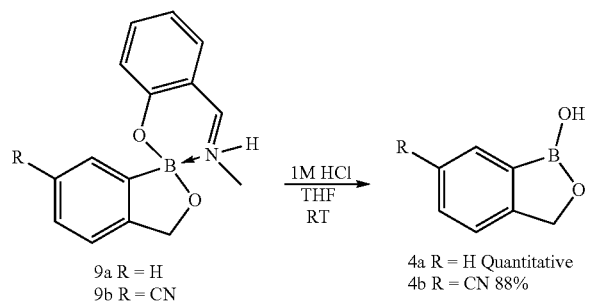

9a R = H
9b R = CN

4a R = H Quantitative
4b R = CN 88%

Deprotection to isolate benzoxaborole (4a). To a round-bottom flask containing a solution of 9a (150 mg, 0.60 mmol) in THF (2 mL) was added 1M HCl (4 mL) at RT. The mixture was stirred for 2 hours at RT, after which the mixture was diluted with EtOAc (~10 mL). The mixture was transferred to a separatory funnel containing water (~5 mL) and extracted. The aqueous layer was extracted further with EtOAc (2×10 mL) and the combined organics were washed with saturated sodium bisulfite (2×10 mL) and brine. After drying over Na$_2$SO$_4$, the organic phase was concentrated to afford 4a (80 mg, Quant.) as a white solid. $^1$H NMR (CDCl$_3$, 400 MHz) δ 5.12 (s, 2H), 5.18 (s, 1H), 7.35 (t, 1H), 7.39 (t, 1H), 7.74 (d, 1H). $^{11}$B NMR (128 MHz, CDCl$_3$) δ 32.60.

Deprotection to isolate 3-cyanobenzoxaborole (4b). To a round-bottom flask containing a solution of 9b (150 mg, 0.60 mmol) in THE (5 mL) was added 1M HCl (2.6 mL) at RT. The mixture was stirred for 2 hours at RT, after which the mixture was diluted with EtOAc (~10 mL). The mixture was transferred to a separatory funnel containing water (~5 mL) and extracted. The aqueous layer was extracted further with EtOAc (2×10 mL) and the combined organics were washed with saturated sodium bisulfite (2×10 mL) and brine. After drying over Na$_2$SO$_4$, the organic phase was concentrated to afford 4b (55 mg, 88%) as an off-white solid. $^1$H NMR (DMSO-d$_6$, 400 MHz) δ 4.24 (s, 2H), 6.80 (d, 11H), 7.06 (d, 1H), 7.10 (s, 1H), 8.66 (s, 1H). 13C NMR (DMSO-d$_6$, 100 MHz) δ 70.63, 110.43, 119.69, 123.38, 134.40, 135.03, 159.14. $^{11}$B NMR (DMSO-d$_6$, 128 MHz) δ 31.50.

Example 1: Benzoxaborole Protection Using 3-(N,N-Dimethylamino)-1-Propanol

Oxidation of primary alcohol (4c) with pyridinium chlorochromate (PCC) in the presence of the benz-oxaborole functionality has proven difficult in the past. 4c has extremely poor solubility and attempts at oxidation resulted in complex mixtures and very low yields of the desired aldehyde product. Solubility was increased by making the methyl or ethyl esters of the benzoxaborole, but complex mixtures were still obtained under oxidative conditions. In order to address the solubility and chemoselectivity issues, novel benzoxaborole protecting groups were sought out. Such protecting groups should a) be inexpensive and readily synthesized, b) be able to withstand mild oxidation conditions, and c) improve the solubility of benzoxaboroles, especially ones containing hydrogen bonding substituents.

Molecules that form 6-membered ring complexes via an ester linkage and dative coordination of a nitrogen were explored. Without wishing to be limited to any particular theory, nitrogen coordination could mask the benzoxaborole boron's p-orbital, which would help decrease side reactivity and possibly improve solubility of compounds with coordinating substituents. To this end, three benzoxaborole protecting groups: 3-(N,N-dimethylamino)-1-propanol 1, N-methylsalicylidenimine 2, and 2-[1-(methylimino)ethyl]phenol 3 were explored.

Compounds containing both an alcohol and amine, which would form a stable, 6-membered ring with the oxaborole, were explored. Amino alcohol 1, which is commercially available and inexpensive, readily coordinated with benzoxaboroles in good yields upon stirring at room temperature in ether:acetone to form complexes 5a-c. During isolation of the product, it was found that the complexes underwent rapid deprotection when exposed to an aqueous environment. Because of the lability of these complexes, complexes 5a-c may be best suited for one-step sequences where the benzoxaborole is protected in situ without further purification, transformed, and readily deprotected and isolated during the reaction workup. It was observed that the organic solubility of these complexes significantly increased compared to the respective benzoxaborole counterparts. Compound 4b was subjected to diisobutylaluminum hydride (DIBAL-H) followed by aqueous workup, which resulted in clean conversion to aldehyde 6 as the only product. While there is detectable product formation when unprotected, DIBAL-H normally causes partial decomposition of the benzoxaborole and leads to a complex reaction mixture which requires chromatographic purification.

Benzylic alcohol oxidation with manganese dioxide proceeded in good yield as another method of producing 6 after deprotection via extractive workup. An iodisation reaction and a Mitsubobu reaction were also conducted to produce the benzyl iodide 7 and substitution product 8, respectively, after deprotection via workup. No reaction was observed when 4c was not protected due to its lack of solubility in the reaction medium. These examples provided evidence that solubility affects the reactivity of these compounds. Based on the promising results with 1, protecting groups that would be stable to column chromatography and suitable across multiple synthetic steps were sought out.

Example 2: Benzoxaborole Protection Using N-methylsalicylidenimine and 2-[1-(methylimino)ethyl]phenol Using the backbone of 1 as a scaffold, a phenolic alcohol was incorporated in order to provide both an increase in complex rigidity and stability. After unsuccessfully evaluating several phenolic o-benzylamine compounds, compounds 2 and 3 were found to have the desired properties.

These protecting groups are readily synthesized from cheap, commercially available salicylaldehyde or 2'-hydroxyacetophenone in excellent yields via condensation with methylamine as described in the literature. To synthesize protected benzoxaboroles 9a-d and 10a-d, compounds 2 and 3, respectively, were refluxed with the corresponding benzoxaborole in toluene under Dean-Stark conditions. All of these protected complexes were stable to mild aqueous conditions, but aqueous acid and strong aqueous base resulted in deprotection. The complexes were found to be stable to aqueous extraction and could be purified by column chromatography.

Additional reactions in the presence of protecting groups 2 and 3 were then explored. Of particular interest were methods of functionalization of alcohols that were previously limited by poor solubility and chemical incompatibility. As discussed in Example 1, attempts to oxidize 6 without protection were either unsuccessful or resulted in complex product mixtures. Protection of 6 with 2 and 3 allowed for the successful oxidization of the primary alcohols to aldehydes 9c and 10c with Dess-Martin perioidinane (DMP) in higher yields than reported in the literature and with no observed side reactivity. Oxidation with PCC was attempted, but the acidic nature of the reagent, even when absorbed onto neutral alumina or buffered with sodium acetate, lead to deprotection. This observation was confirmed upon successfully oxidizing 9c with Collins reagent in 58% yield, proving that the complex can withstand some Cr (VI) reagents.

The stability of the protected species was then explored under reducing conditions. The aldehyde products were subjected to reductive amination conditions in the presence of 4-chloroaniline and sodium triacetoxyborohydride to produce amine 12 in 73% yield. Reactivity was found to be similar when using 2 and 3. Attempts were made to functionalize 12 by subjecting it to an Appel reaction to make reactive benzylic electrophiles. The reaction proceeded smoothly and the product remained intact, but separation of the triphenylphosphine oxide byproduct proved challenging.

Optimal deprotection conditions were explored for removing 2 from the protected complexes. It was observed that mild aqueous acidic conditions lead to deprotection of these complexes. 1M HCl in THF solvent was found to smoothly deprotect 9a and 9b at room temperature in two-three hours and did not require column chromatography to re-isolate the free benzoxaborole. Avoiding the need for column chromatography is advantageous because chromatography of unprotected benzoxaboroles usually results in low recovered yields.

The disclosures of each and every patent, patent application, and publication cited herein are hereby incorporated herein by reference in their entirety. While this invention has been disclosed with reference to specific embodiments, it is apparent that other embodiments and variations of this invention may be devised by others skilled in the art without departing from the true spirit and scope of the invention. The appended claims are intended to be construed to include all such embodiments and equivalent variations.

What is claimed is:

1. A method of deprotecting a boronic acid containing compound, the method comprising contacting:

(a) a compound of formula (II) or (II'), or a salt, solvate, enantiomer, diastereomer, or tautomer thereof:

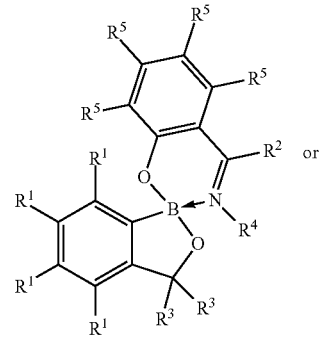

(II)

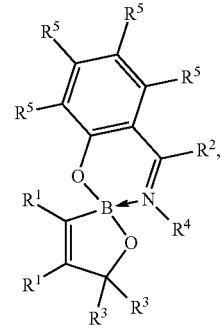

(II')

wherein:
each occurrence of $R^1$ is independently selected from the group consisting of H, OH, halogen, amine, carboxylic acid, C(=O)O($C_1$-$C_4$ alkyl), C(=O)$NH_2$, C(=O)NH ($C_1$-$C_4$ alkyl), C(=O)N($C_1$-$C_4$ alkyl), C(=NH)$NH_2$, phosphoric acid, phosphonate, sulfonamide, nitro, cyano, optionally substituted $C_1$-$C_6$ alkyl, optionally substituted $C_2$-$C_6$ alkenyl, optionally substituted $C_2$-$C_6$ alkynyl, optionally substituted $C_3$-$C_8$ cycloalkyl, optionally substituted $C_1$-$C_8$ heteroalkyl, optionally substituted $C_3$-$C_8$ heterocycloalkyl, optionally substituted $C_1$-$C_6$ perhaloalkyl, optionally substituted $C_1$-$C_6$ alkoxy, optionally substituted aryl, optionally substituted aryloxy, optionally substituted heteroaryl, optionally substituted heteroaryloxy, and optionally substituted benzyl, $R^2$ is selected from the group consisting of H, halogen, optionally substituted $C_1$-$C_6$ alkyl, optionally substituted $C_2$-$C_6$ alkenyl, optionally substituted $C_2$-$C_6$ alkynyl, optionally substituted $C_3$-$C_8$ cycloalkyl, optionally substituted $C_1$-$C_8$ heteroalkyl, optionally substituted $C_3$-$C_8$ heterocycloalkyl, and optionally substituted $C_1$-$C_6$ perhaloalkyl;

each occurrence of $R^3$ is independently selected from the group consisting of H, OH, halogen, amine, optionally substituted $C_1$-$C_6$ alkyl, optionally substituted $C_2$-$C_6$ alkenyl, optionally substituted $C_2$-$C_6$ alkynyl, optionally substituted $C_3$-$C_8$ cycloalkyl, optionally substituted $C_1$-$C_8$ heteroalkyl, optionally substituted $C_3$-$C_8$ heterocycloalkyl, optionally substituted $C_1$-$C_6$ perhaloalkyl, optionally substituted $C_1$-$C_6$ alkoxy, optionally substituted aryl, optionally substituted aryloxy, optionally substituted heteroaryl, optionally substituted heteroaryloxy, optionally substituted benzyl, carboxylic acid, C(=O)O(C$_1$-C$_4$ alkyl), C(=O)NH$_2$, C(=O)NH(C$_1$-C$_4$ alkyl), C(=O)N(C$_1$-C$_4$ alkyl)$_2$, SO$_2$NH$_2$, and C(=NH)NH$_2$;

R$^4$ is selected from the group consisting of H, optionally substituted C$_1$-C$_6$ alkyl, optionally substituted C$_3$-C$_8$ cycloalkyl, optionally substituted C$_1$-C$_8$ heteroalkyl, and optionally substituted C$_3$-C$_8$ heterocycloalkyl; and each occurrence of R$^5$ is independently selected from the group consisting of H, halide, nitro, nitrile and optionally substituted C$_{1-6}$ alkyl;

and (b) an acidic solution;

to yield a (benz)oxaborole or oxaborole of formula:

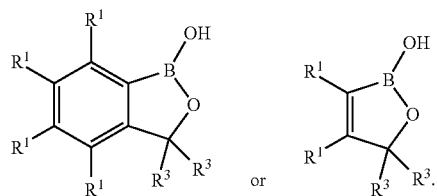

2. The method of claim 1, wherein each occurrence of R$^1$ is independently selected from the group consisting of OMe, NO$_2$, CH$_2$OH, CH$_2$I, CHO, CN, F, Cl, Br, I, CF$_3$, CH$_2$Cl, CH$_2$Br, C$_1$-C$_6$ carboxylate, C$_1$-C$_6$ thioether,

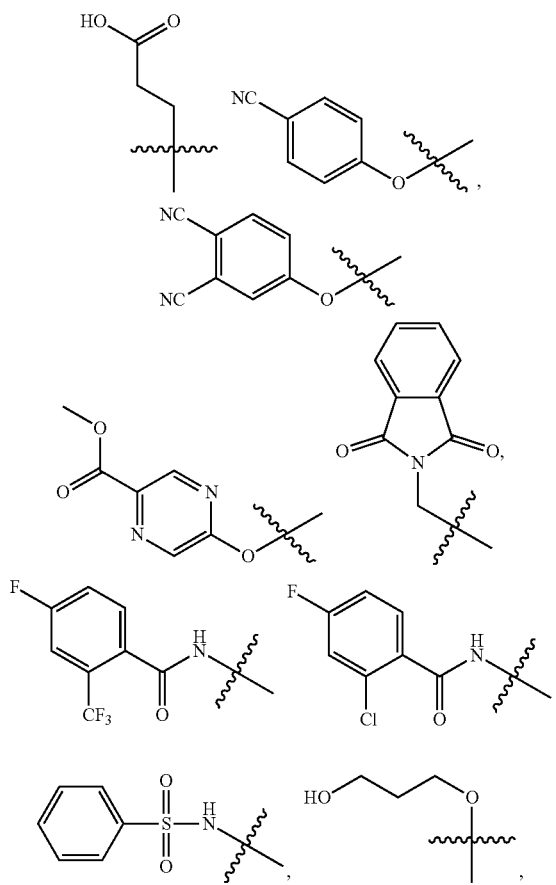

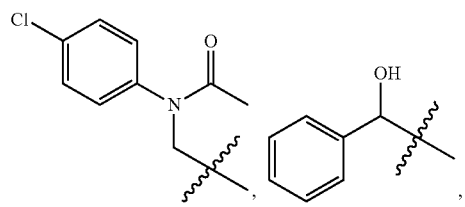

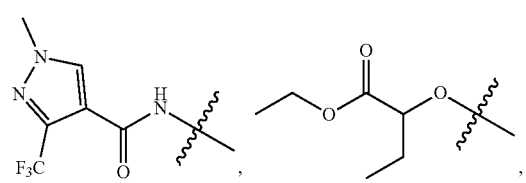

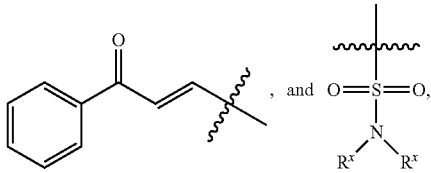

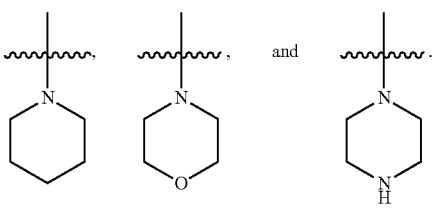

wherein each occurrence of R$^x$ is independently selected from the group consisting of H and optionally substituted C$_1$-C$_6$ alkyl.

3. The method of claim 1, wherein each occurrence of R$^3$ is independently selected from the group consisting of H, optionally substituted C$_1$-C$_6$ cyanoalkyl, optionally substituted C$_1$-C$_6$ nitroalkyl, optionally substituted C$_1$-C$_6$ aminoalkyl,

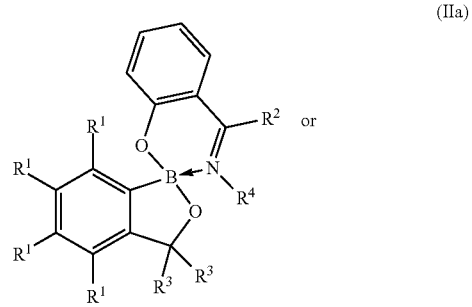

4. The method of claim 1, which is a compound of formula (IIa) or (IIa'):

(IIa)

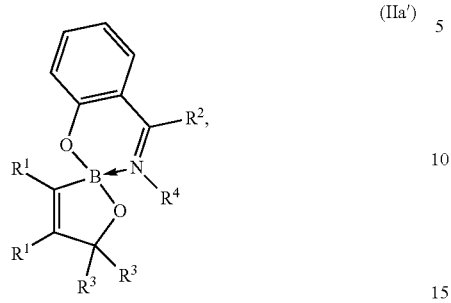
wherein R² is selected from the group consisting of H, optionally substituted $C_1$-$C_6$ alkyl, and optionally substituted $C_3$-$C_8$ cycloalkyl.
5. The compound of claim 4, wherein R² is selected from the group consisting of H and methyl.
6. The compound of claim 4, wherein the compound of formula (IIa) is selected from the group consisting of:
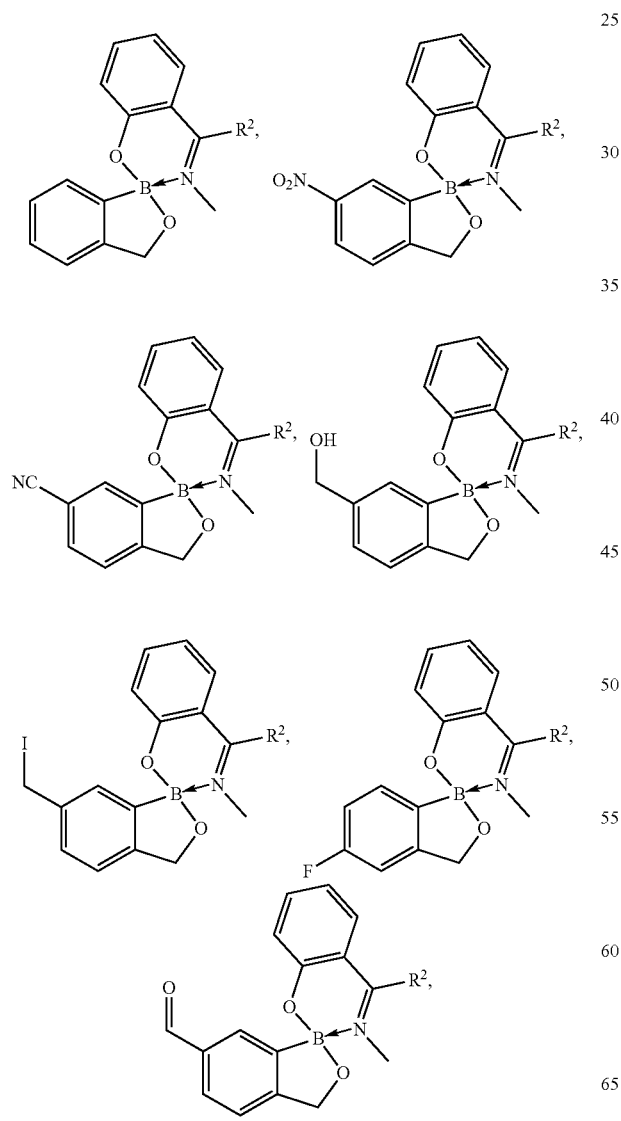
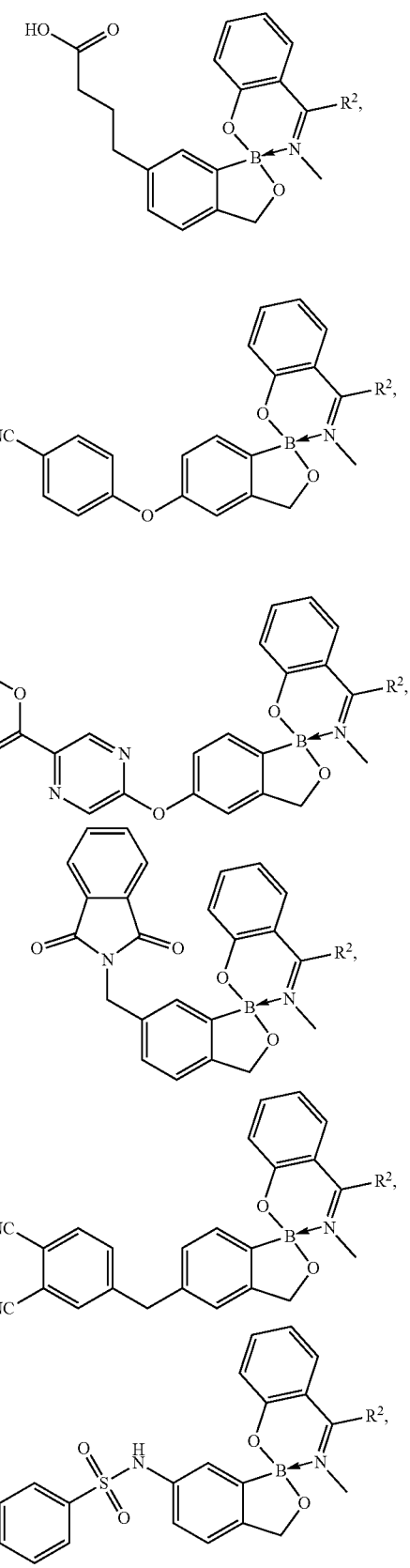

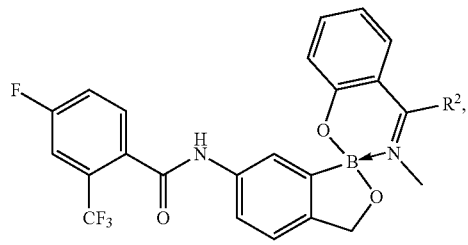
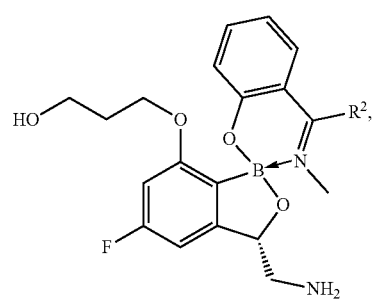
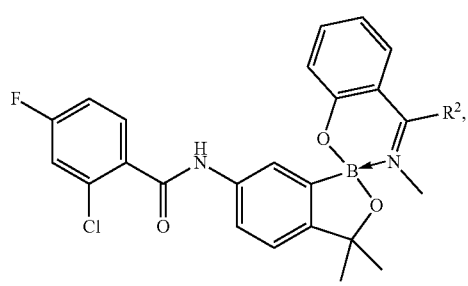
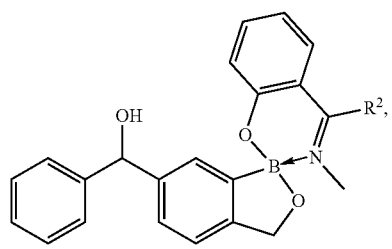
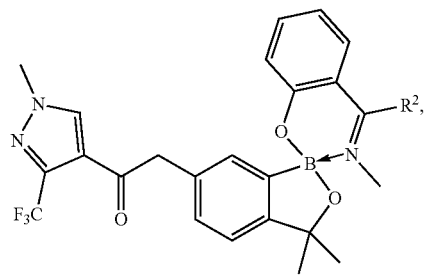
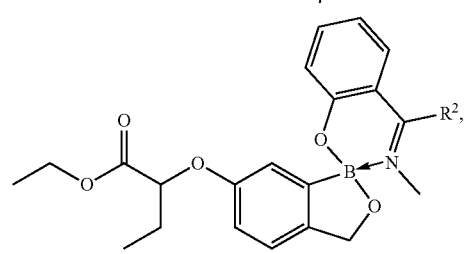
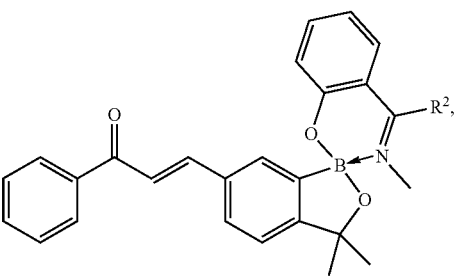
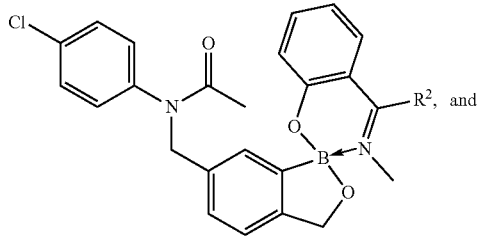
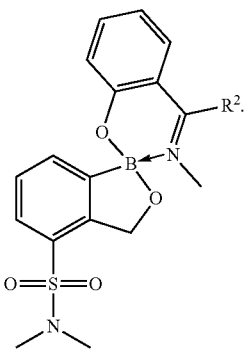
7. The method of claim 1, wherein the boronic acid containing compound is selected from the group consisting of:
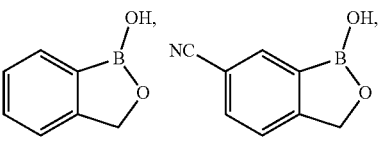
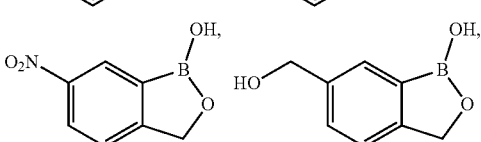
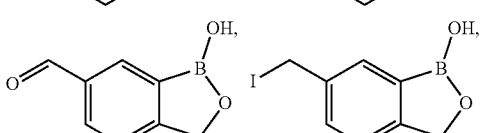
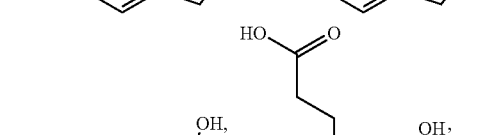
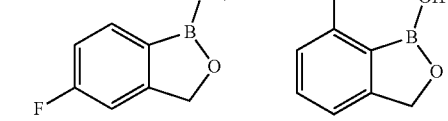

65
-continued
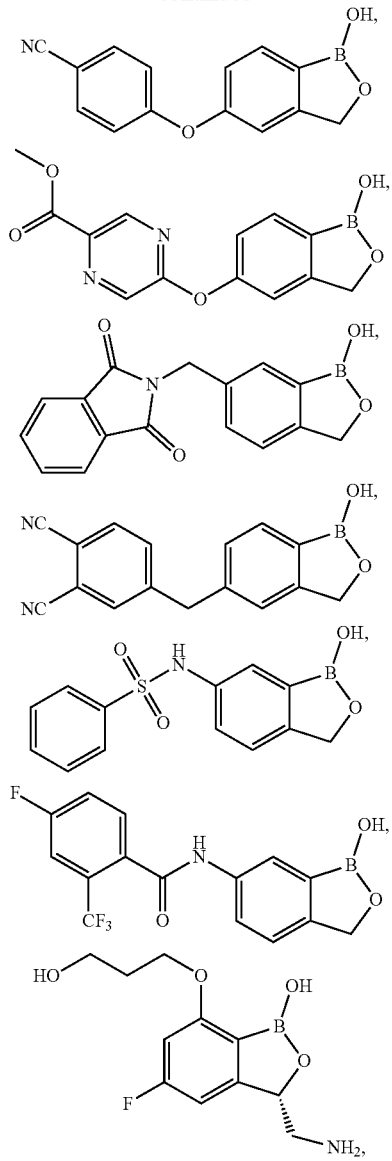
66
-continued
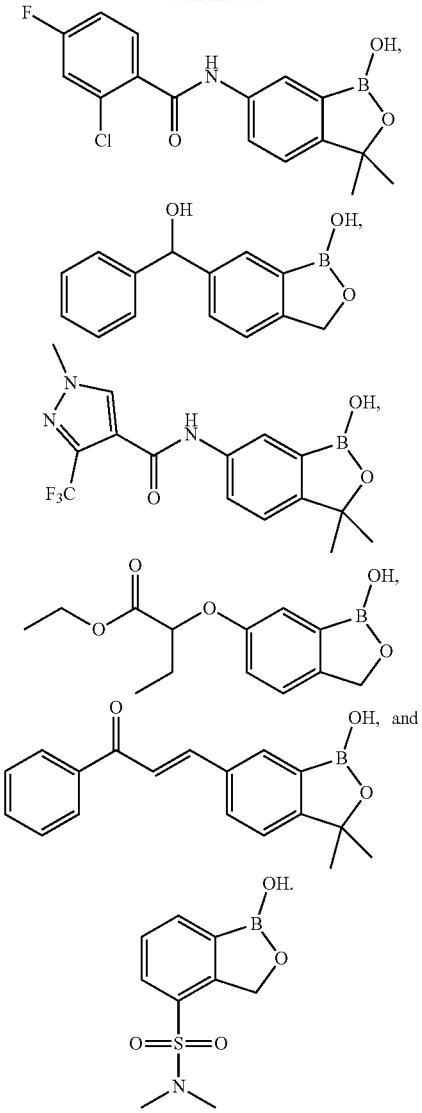
* * * * *